(12) United States Patent
Kawada et al.

(10) Patent No.: US 6,985,131 B2
(45) Date of Patent: Jan. 10, 2006

(54) LIQUID CRYSTAL DISPLAY DEVICE

(75) Inventors: Tomoaki Kawada, Mobara (JP); Akio Tezuka, Mobara (JP); Hisao Hirayama, Mobara (JP); Toshitsugu Miyawaki, Mobara (JP); Masataka Natori, Abiko (JP)

(73) Assignees: Hitachi, Ltd., Tokyo (JP); Hitachi Electronic Devices Co., Ltd., Chiba-ken (JP)

( * ) Notice: Subject to any disclaimer, the term of this patent is extended or adjusted under 35 U.S.C. 154(b) by 106 days.

(21) Appl. No.: 09/910,862

(22) Filed: Jul. 24, 2001

(65) Prior Publication Data

US 2002/0030650 A1 Mar. 14, 2002

(30) Foreign Application Priority Data

Jul. 28, 2000 (JP) .............................. 2000-228976
Aug. 25, 2000 (JP) .............................. 2000-254964

(51) Int. Cl.
G09G 3/36 (2006.01)

(52) U.S. Cl. ......................... 345/102; 349/61; 349/96
(58) Field of Classification Search ................ 345/87, 345/88, 102, 103; 349/60–71, 96
See application file for complete search history.

(56) References Cited

U.S. PATENT DOCUMENTS 5,375,043 A * 12/1994 Tokunaga .................... 362/31
5,897,184 A * 4/1999 Eichenlaub et al. .......... 349/64
6,147,725 A * 11/2000 Yuuki et al. .................. 349/65
6,196,691 B1 * 3/2001 Ochiai ......................... 362/31
6,266,108 B1 * 7/2001 Bao et al. ..................... 349/63
6,411,353 B1 * 6/2002 Yarita et al. .................. 349/59
2002/0005991 A1 * 1/2002 Masaki et al. ............... 359/599

FOREIGN PATENT DOCUMENTS

| JP | 9-35518 | 7/1995 |
| JP | 9-258030 | 3/1996 |
| JP | 10-321024 | 5/1997 |

* cited by examiner

Primary Examiner—Xiao Wu
Assistant Examiner—Jean Lesperance

(57) ABSTRACT

In a liquid crystal display device having the so-called side-edge type backlight system which comprises: a liquid crystal display panel; a light guide plate being disposed opposite to a main surface of the liquid crystal panel; and a linear lamp being disposed along one of sides of the light guide plate, the present invention provides a plurality of grooves at a corner area of an edge of the light guide plate along which the linear lamp is disposed so that the plurality of grooves are extended in a direction slanted to the edge of the light guide plate. In accordance with this structural feature, the present invention enables a high quality image display performance of the liquid crystal display panel by suppressing the display irregularity appearing therein effectively.

23 Claims, 17 Drawing Sheets

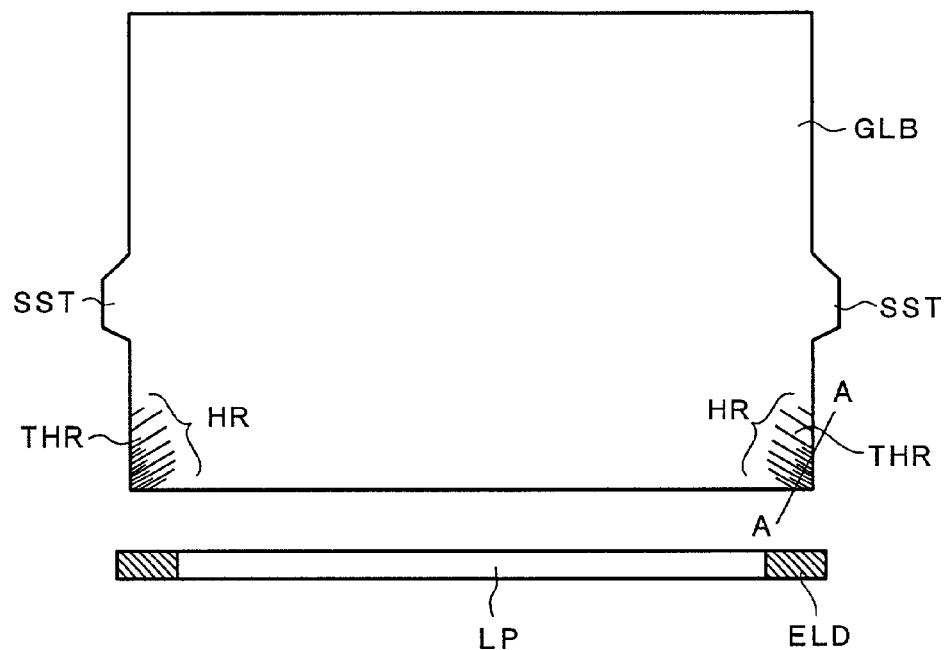
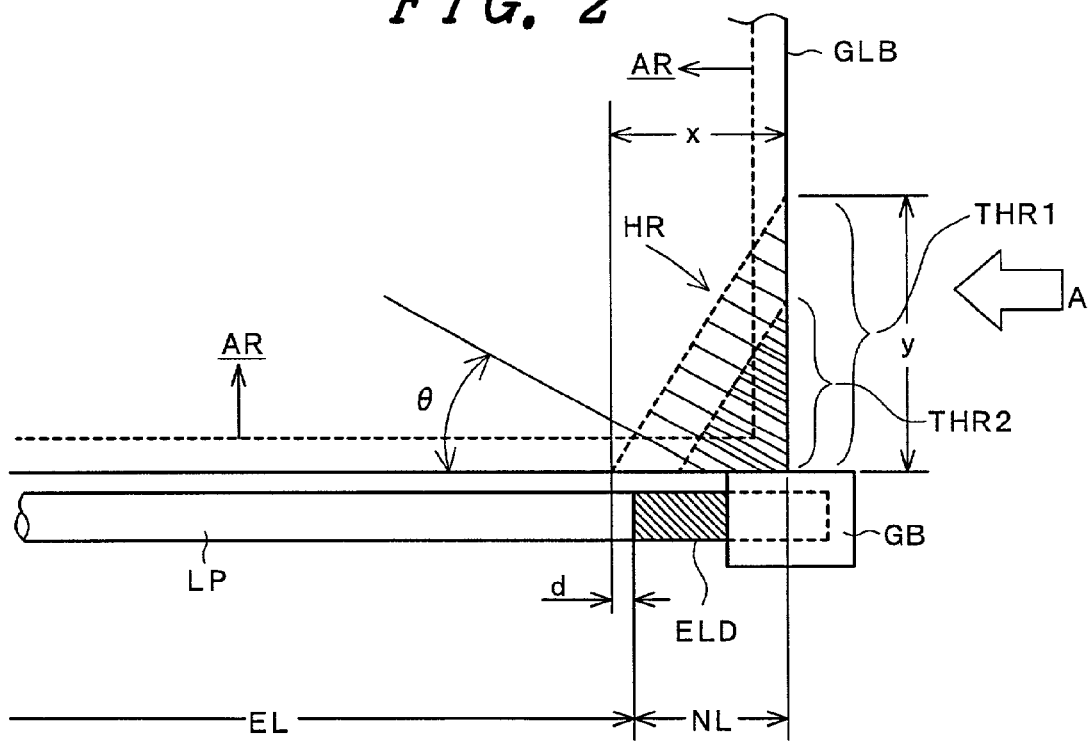

FIG. 10

| Rotation Angle $\phi xz$ | Air Layer | | | Acrylic Layer | | |
|---|---|---|---|---|---|---|
| | Expansion Angle $\phi$ | Wedged Cross-Sectional Angle $\phi yz$ | Planar Angle $\phi xy$ | Expansion Angle $\phi'$ | Wedged Cross-Sectional Angle $\phi' yz$ | Planar Angle $\phi'xy$ |
| 0 | 60 | 0 | 60 | 35.53676 | 0 | 35.53676 |
| 15 | 60 | 24.14611 | 59.13252 | 35.53676 | 10.47371 | 34.60271 |
| 30 | 60 | 40.89339 | 56.30993 | 35.53676 | 19.65321 | 31.73963 |
| 45 | 60 | 50.76848 | 50.76848 | 35.53676 | 26.79647 | 26.79647 |
| 60 | 60 | 56.30993 | 40.89339 | 35.53676 | 31.73963 | 19.65321 |
| 75 | 60 | 59.13252 | 24.14611 | 35.53676 | 34.60271 | 10.47371 |
| 90 | 60 | 60 | 6.08E-15 | 35.53676 | 35.53676 | 2.51E-15 |
| 105 | 60 | 59.13252 | -24.1461 | 35.53676 | 34.60271 | -10.4737 |
| 120 | 60 | 56.30993 | -40.8934 | 35.53676 | 31.73963 | -19.6532 |
| 135 | 60 | 50.76848 | -50.7685 | 35.53676 | 26.79647 | -26.7965 |
| 150 | 60 | 40.89339 | -56.3099 | 35.53676 | 19.65321 | -31.7396 |
| 165 | 60 | 24.14611 | -59.1325 | 35.53676 | 10.47371 | -34.6027 |
| 180 | 60 | 1.22E-14 | -60 | 35.53676 | 5.01E-15 | -35.5638 |
| 195 | 60 | -24.1461 | -59.1325 | 35.53676 | -10.4737 | -34.6027 |
| 210 | 60 | -40.8934 | -56.3099 | 35.53676 | -19.6532 | -31.7396 |
| 225 | 60 | -50.7685 | -50.7685 | 35.53676 | -26.7965 | -26.7965 |
| 240 | 60 | -56.3099 | -40.8934 | 35.53676 | -31.7396 | -19.6532 |
| 255 | 60 | -59.1325 | -24.1461 | 35.53676 | -34.6027 | -10.4737 |
| 270 | 60 | -60 | -1.8E-14 | 35.53676 | -35.5638 | -7.5E-15 |
| 285 | 60 | -59.1325 | 24.14611 | 35.53676 | -34.6027 | 10.47371 |
| 300 | 60 | -56.3099 | 40.89339 | 35.53676 | -31.7396 | 19.65321 |
| 315 | 60 | -50.7685 | 50.76848 | 35.53676 | -26.7965 | 26.79647 |
| 330 | 60 | -40.8934 | 56.30993 | 35.53676 | -19.6532 | 31.73963 |
| 345 | 60 | -24.1461 | 59.13252 | 35.53676 | -10.4737 | 34.60271 |
| 360 | 60 | -2.4E-14 | 60 | 35.53676 | -1E-14 | 35.53676 |

LIGHT PROPAGATION ALONG
A WEDGED CROSS SECTION

LIGHT PROPAGATION ALONG A PLANE

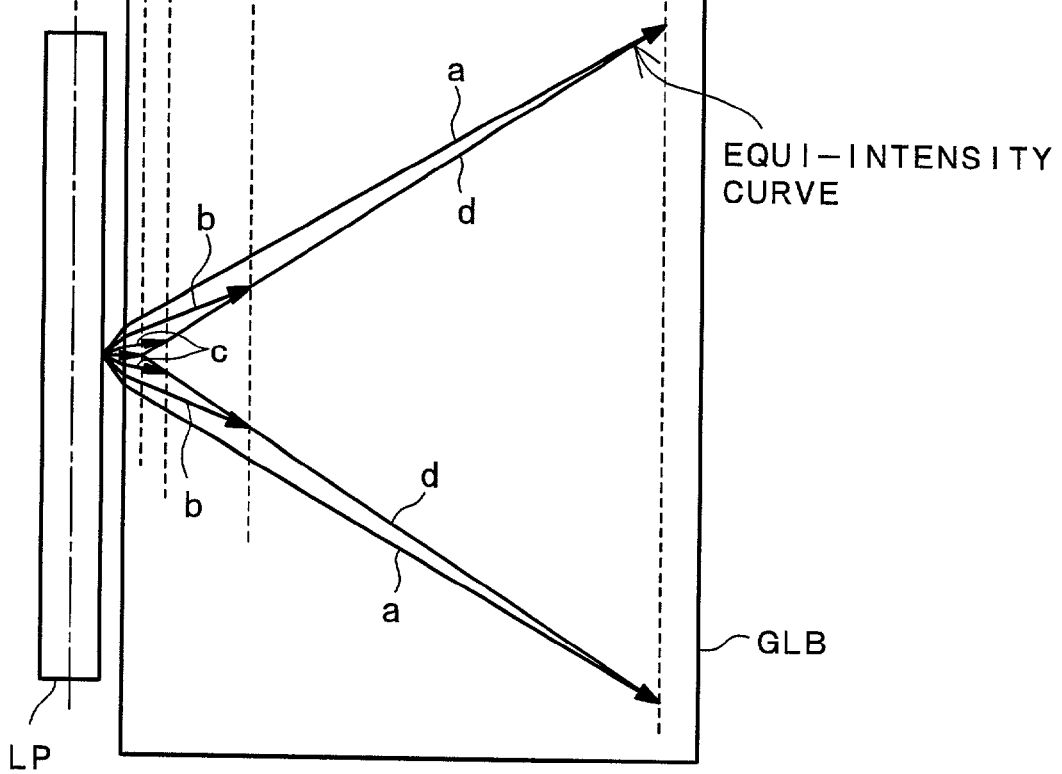
Intensity Distribution of Light Along Patterned Surface Produced by A Representative Light Source

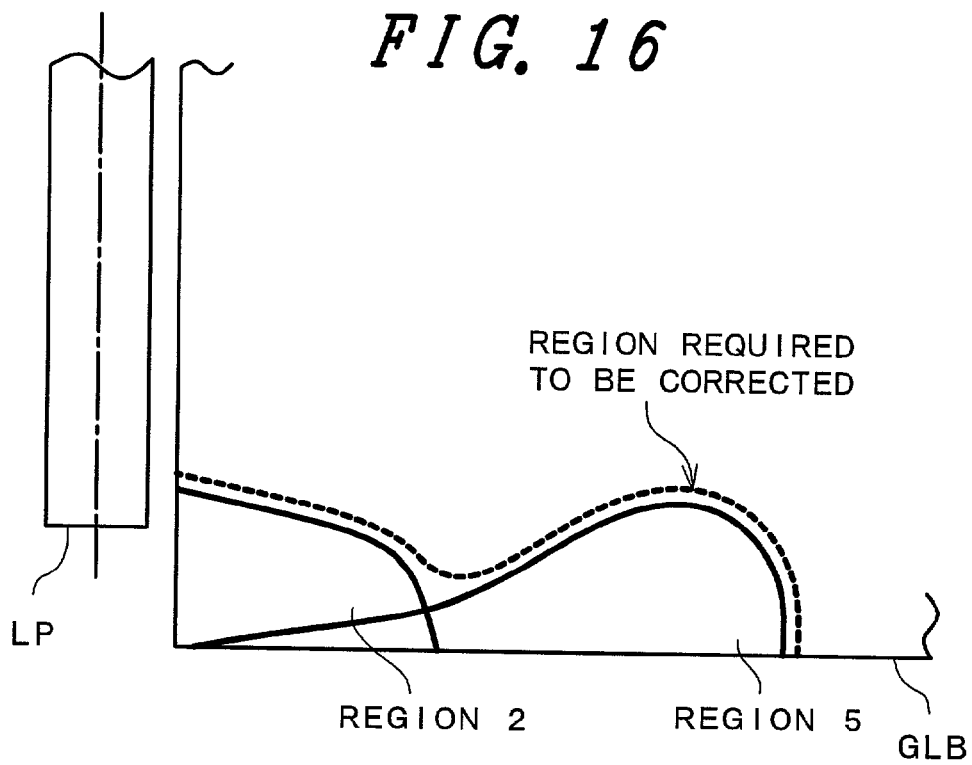
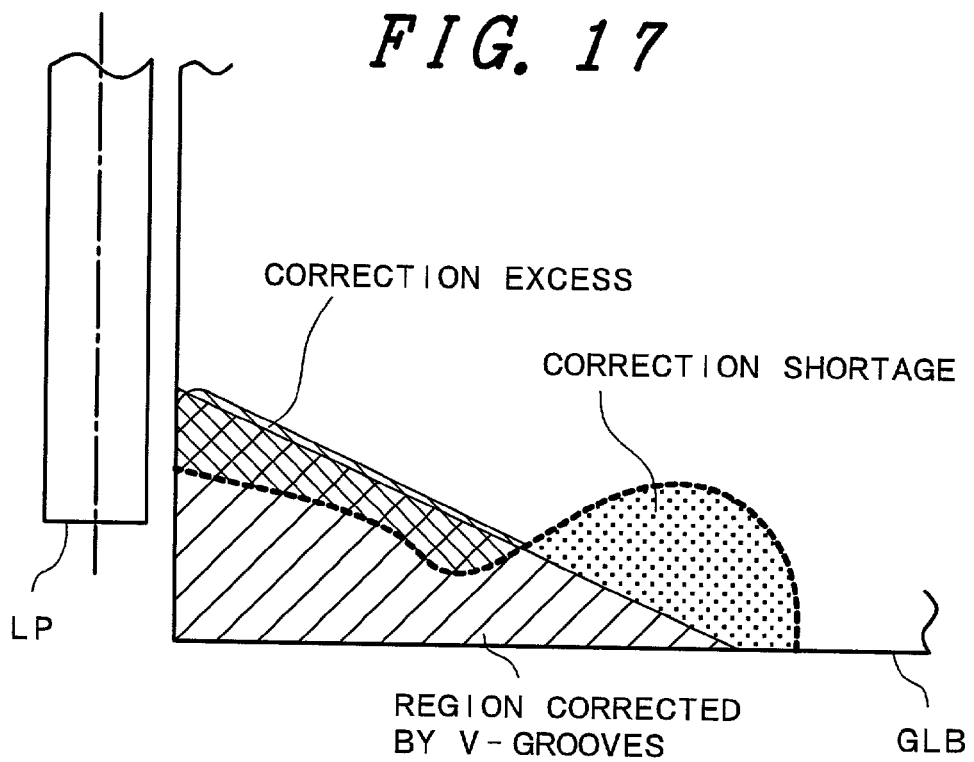

LIQUID CRYSTAL DISPLAY DEVICE

BACKGROUND OF THE INVENTION

1. Field of the Invention

The present invention relates to a liquid crystal display device, and more particularly to a liquid crystal display device which is provided with a backlight on a rear surface of a liquid crystal panel, is light-weighted and can cope with the reduction in picture frame.

2. Description of the Related Art

A liquid crystal display device has been widely used as a high-definition color display device for a notebook type computer or a computer monitor. Such a liquid crystal display device which enables the high definition color display for the notebook type computer or the computer monitor is provided with a light source which illuminates a liquid crystal panel from a rear surface thereof (so-called backlight).

This type of liquid crystal display device is basically constituted of a so-called liquid crystal panel which inserts a liquid crystal layer between two sheets of substrates wherein at least one of the substrates is made of a transparent substrate such as a glass plate or the like. The liquid crystal display device is roughly classified into a system which performs turning on and off of given pixels by selectively applying voltages to respective electrodes for forming pixels which are formed on the above-mentioned substrate of the liquid crystal panel (simple matrix) and a system which forms the above-mentioned respective electrodes and active elements for selecting pixels and performs turning on and off of given pixels by selecting these active elements (active matrix).

As an active matrix type liquid crystal display device, a so-called vertical electric field type (for example, see Japanese Patent Laid-Open No. 309921/1988) which applies an electric field between pixel electrodes formed on one substrate and common electrodes formed on the other substrate for changing the orientation direction of a liquid crystal layer and a so-called lateral electric field type (also referred to as IPS type) which makes the direction of an electric field applied to a liquid crystal layer arranged in the direction approximately parallel to a surface of a substrate are known.

As the liquid crystal display device of the lateral electric field type, a liquid crystal display device which can obtain an extremely wide viewing angle by using comb-teeth electrodes on one of two sheets of substrates is known (see Japanese Patent Laid-Open No. 21907/1988, U.S. Pat. No. 4,345,249).

In either one of the above-mentioned liquid crystal display device as an illumination source of the liquid crystal panel, there has been known a side-edge type backlight which is constituted of a light guide plate and linear lamp or a direct backlight which arranges a plurality of linear light sources such that they directly face a rear surface of the liquid crystal panel in an opposed manner.

Particularly, the backlight of side-edge type is constituted such that the linear lamp (usually cold-cathode fluorescent lamp CFL) is arranged along at least one side periphery of a transparent plate such as an acrylic plate or the like, light emitted from the linear lamp is introduced into the light guide plate and the path of the light is changed in the course of its propagation in the inside of the light guide plate so as to illuminate the liquid crystal panel disposed above the light guide plate from the rear surface of the panel.

Further, recently, along with the popularization of multi-media and mobile computing, the popularization of a notebook type personal computer or a handy terminal or the like having functions comparable with functions of a desktop type computer has been in progress. As a display device of such equipment, a screen device having a large screen of a size of 14–15 inches has been currently commercialized in the notebook type personal computer. Further, in the personal computer of desktop type or the like, a monitor having a large screen of 17–20 inches or more which uses a liquid crystal panel has been requested and they have been actually commercialized. Further, in the handy terminal, a liquid crystal display device of a reflection type is used in many cases.

SUMMARY OF THE INVENTION

For example, with respect to the notebook type personal computer or the like, to mount a liquid crystal display device having a panel size of nominal 14–15 inches on an upper side housing (lid portion), it is necessary to promote the reduction in picture frame to a limit such that the substantially a whole area that a lid has becomes an effective display region.

To narrow the picture frame of the liquid crystal display device, it is necessary to make the length of the linear lamp (for example, cold-cathode ray tube) become substantially equal to the size of the side of the light guide plate. The linear lamp has electrodes at both ends thereof and there is no light emission from these electrodes and hence, a light quantity emitted from the light guide plate to the liquid crystal panel is reduced in the vicinity of the electrodes whereby the brightness is reduced.

FIG. 26 is a schematic plan view for explaining an general structure of a conventional side-edge type backlight. This side-edge type backlight (hereinafter simply referred to as "backlight") usually uses a light guide plate GLB which is made of a transparent acrylic plate having a wedged cross section which reduces the thickness thereof as the distance becomes apart from a side (light incidence surface) of the light guide plate GLB along which a linear lamp LP is usually mounted (arranged).

This type of light guide plate GLB is provided with a so-called printing dots or an uneven granulated pattern for emitting light which is incident on the light guide plate GLB from the linear lamp LP and propagates in the inside of the light guide plate GLB.

However, due to the necessity to make the linear lamp short in view of achieving the reduction in picture frame, at corner portions of a side of an incidence surface of the light guide plate GLB which is indicated by C in FIG. 26, a light emitting quantity in the liquid crystal panel direction is decreased as shown by hatching in the drawing due to the presence of non-light emitting areas of portions of electrodes ELD of the linear lamp LP thereby giving rise to the brightness irregularity in a display plane of the liquid crystal panel.

Conventionally, to solve the occurrence of such brightness irregularity, following techniques have been known. That is, the covering area of the printing dots or the irregular granulated pattern at the above-mentioned corner portion is increased and a large number of V-shaped grooves are formed in the corner portion in parallel to the side of the light guide plate (Japanese Patent Laid-Open No. 98383/2000). Further, a large number of pyramidal protrusions are formed of longitudinal and lateral grooves which are formed in parallel to or perpendicular to the side of the light guide plate are formed in the corner portion so as to increase a light reflection quantity in the liquid crystal panel direction (see Japanese Patent Laid-Open No. 151924/1995).

Further, as other means, with the use of sandblasting, a surface roughening treatment may be applied to a corner portion of a mold for the light guide plate or a stamper mounted on the mold.

Accordingly, it is an object of the invention to provide a liquid crystal display device which enables a high quality image display by effectively preventing the occurrence of display irregularity which may be brought about by the reduction of the picture frame of the liquid crystal display device.

In a liquid crystal display device having the so-called side-edge type backlight system which comprises: a liquid crystal display panel having a pair of substrates between which a liquid crystal layer is interposed; a light guide plate being disposed opposite to a main surface of one of the pair of substrates; and at least one linear lamp being disposed along one of sides of the light guide plate, the aforementioned objects can be achieved by forming a plurality of grooves at a corner area on one of a pair of main surfaces of the light guide plate (one of the pair of main surfaces being opposite to the main surface of one of the pair of substrates) along the one of sides of the light guide plate (along the linear lamp, in other words) so that the plurality of grooves are extended in a direction slanted to the one of the sides of the light guide plate (to a longitudinal direction of the linear lamp, in other words). The corner area is denoted as an area in a plane of the one of the pair of main surfaces of the light guide plate at which one side of the one of the pair of main surfaces along the linear lamp intersects with another side thereof (including a virtual extension thereof) and the vicinity of the area. If the tip portion of the corner area is chamfered, both of virtual extensions (imaginary extensions, in other words) of the one side of the one of the pair of main surface of the light guide plate and the another thereof are regarded to intersect with one another the tip portion of the corner area.

More in detail, the one of the pair of main surfaces of the light guide plate is surrounded by a plurality of edges thereof, and the corner portion is located at an end of one of the plurality edges along which the at least one linear lamp is disposed. The corner portions may be provided respectively at each of ends of the one of the plurality edges, also. In this case, the plurality of grooves are formed at both of the corner portions. Furthermore, density of the plurality of grooves at an intermediate area located on the one of the pair of the main surfaces of the light guide plate between the both corner areas thereof should be lower than those at the both corner areas thereof, and preferably, the plurality of grooves are not formed at the intermediate area.

If both the one of the plurality of edges (extended along the aforementioned at least one linear lamp) surrounding the one of the pair of main surfaces and another of the plurality of edges extended in a transverse direction to the one of the plurality of edges extend along the corner area, the plurality of grooves should be formed so as to intersect with at least one of the one and the another of the plurality of edges. In this case, extension lengths of the plurality of grooves from intersecting points thereof with the at least one of the one and the another of the plurality of edges of the one of the pair of main surfaces of the light guide plate should decrease as far as the intersecting points are spaced from a tip portion of the corner area. The plurality of grooves may also be formed so as to be divided into at least two groups in accordance with intersecting angle thereof with the one of the plurality of edges surrounding the one of the pair of main surfaces of the light guide plate (the one of the plurality of edges extended along the linear lamp).

On the other hand, the plurality of grooves may be extended radially from the one of the plurality of edges surrounding the one of the pair of main surfaces of the light guide plate and being extended along the linear lamp (the aforementioned at least one linear lamp). The plurality of grooves may also be formed so as to be divided into at least two groups in accordance with locations of respective base points one of which each of the plurality of grooves is extended radially from.

Furthermore, density of the plurality of grooves on the one of the pair of main surfaces of the light guide plate should decrease as far as intersecting points thereof with the at least one of the one of the plurality of edges surrounding the one of the pair of main surfaces and being extended along the linear lamp or another of the plurality edges are spaced from a tip portion of the corner area.

Respective means for embodying the present invention will be exemplified as follows.

According to the first means of the invention to achieve the above-mentioned object, on a surface (incidence surface) of a corner portion of a side on which a linear lamp for a light guide plate is mounted, a light emission control pattern which is constituted of a plurality of grooves whose extensions have an inclination against the side on which the linear lamp is mounted (grooves extending in the direction which intersects the side at a given angle) is formed.

This light emission control pattern can be formed by forming the grooves on the corner portion of the stamper which takes an symmetry in a plane at the incidence surface side using means such as cutting.

Although V-shaped grooves are suitable as these grooves, the shape of the grooves may be suitably changed into a U-shape or a semicircular trough groove or other shape which has a light reflection function.

The above-mentioned light emission control pattern is used along with the light guide plate which is subjected to the conventional dot printing (printing dot pattern) or the roughening treatment (granulated pattern). Particularly in case of the granulated pattern, the granulated pattern and the light emission control pattern are formed on the stamper so that the grooves of the light emission control pattern can be formed simultaneous with the formation of the irregularity of granulated pattern.

Then, by increasing the arrangement density of the grooves which constitute the light emission control pattern at an end of the corner portion, a light reflection quantity at the end of the corner portion can be increased.

Alternatively, by radially forming the grooves from the end of the corner portion, a light reflection quantity at the end of the corner portion can be increased.

Further, by forming the grooves in parallel to each other, the arrangement density of the light emission control pattern can be controlled by controlling the extension length of individual grooves.

Further, the arrangement density of the light emission control pattern can be controlled by forming the grooves in parallel to each other and making either one or both of the arrangement pitch and the depth of individual grooves differ from each other.

Due to such constitutions, the distribution of light quantity emitted from the light guide plate can be made uniform so that the occurrence of the display irregularity in a plane of the liquid crystal panel can be suppressed.

According to the second means of the invention to achieve the above-mentioned object, on a surface of a corner portion of a side on which a linear lamp for a light guide plate is mounted (incidence surface), a composite light emission control pattern which is made of a combination of a plurality of grooves whose extensions have an inclination to the side on which the linear lamp is mounted or which are formed in a fan shape expanding in the center direction of the light guide plate and fine dots is formed.

This composite light emission control pattern can be formed by forming grooves similar to those of the first means of the invention using means such as cutting on the corner portion of the stamper which takes a symmetry in the plane at the incidence surface side, and further forming the fine dots on the surface of the region where the grooves are formed. However, the composite light emission control pattern can be realized by performing the surface roughening treatment on the surface of the groove formed region using sandblasting or a sand paper after forming the grooves.

The composite light emission control pattern is used along with the light guide plate which is subjected to the dot printing (printing dot pattern) or irregularity (granulated pattern) treatment which has been known conventionally.

The arrangement density of the above-mentioned grooves which constitute the composite light emission control pattern and the distribution pattern of fine dots are provided along with the display irregularity on the surface of the light guide plate and the control is performed such that a light emission quantity of the surface of the light guide plate can be increased at the portion where the brightness is insufficient and the light emission quantity is decreased at the portion where the brightness is excessively high. Here, the arrangement density of the grooves and the arrangement of the fine dots have the wholes thereof or portions thereof overlapped with each other to achieve a desired brightness control.

Due to such a constitution, the distribution of the light quantity emitted from the light guide plate can be made more uniform so that the occurrence of the display irregularity in a plane of the liquid crystal panel can be suppressed.

The invention is not limited to the above-mentioned constitutions and the constitution of embodiments which will be explained hereinafter and various modifications can be made without departing from the technical concept of the invention.

These and other object, features and advantages of the invention will become more apparent from the following description when taken in conjunction with the accompanying drawings.

BRIEF DESCRIPTION OF THE DRAWINGS

FIG. 1 is a plan view of a backlight for schematically explaining a first embodiment of a liquid crystal display device according to the invention;

FIG. 2 is an enlarged view of a corner portion of a light guide plate in FIG. 1;

FIG. 7A to FIG. 7C are plan views of a corner portion of a light guide plate as one modification based on the third embodiment or the fourth embodiment of the invention, wherein FIG. 7A shows a pattern in which a plurality of grooves are radially formed inside a surface of the light guide plate from a virtual center which is disposed outside the light guide plate, FIG. 7B shows a pattern in which two kinds of plural grooves which differ in the depth from the end of the light guide plate are radially formed inside a surface of the light guide plate, and FIG. 7C shows a pattern in which two kinds of plural grooves which differ in depth are radially formed inside a surface of the light guide plate from two respective virtual centers which are disposed outside the light guide plate;

FIG. 8A and FIG. 8B are plan views of the corner portion of the light guide plate as another modification based on the third embodiment or the fourth embodiment of the invention, wherein FIG. 8A shows a pattern in which two kinds of grooves THR1, THR2 are slanted in the same direction to a side of the light guide plate (both grooves being slanted upwardly in the leftward direction to a lower side shown in the drawing) and FIG. 8B shows a pattern in which two kinds of grooves THR1, THR2 are slanted in the different directions (the grooves THR1 being slanted upwardly in the leftward direction and the grooves THR2 being slanted upwardly in the lightward direction to the lower side shown in the drawing);

FIG. 10 is an explanatory view which sums up a result which is obtained by analyzing the relationship among an expansion angle between an air layer and a light guide plate, a wedged cross-sectional angle and a planar angle to a rotation angle in the coordinates system of FIG. 9 in a table;

FIG. 14A an FIG. 14B are explanatory views for showing the distribution of light of equi-intensity which is emitted from one point of a linear lamp and progresses inside the light guide plate, wherein FIG. 14A shows the distribution in the cross-section of the light guide plate and FIG. 14B shows the distribution in the plane of the light guide plate;

FIG. 15A and FIG. 15B are schematic views for explaining the progress of light which is emitted from a plurality of points of the linear lamp and an incident on the light guide plate, wherein FIG. 15A shows the progress of the light in the cross section of the light guide plate and FIG. 15B shows the progress of the light in the plane of the light guide plate;

FIG. 16 is an explanatory view of a region in the corner portion of the light guide plate which requires the correction;

FIG. 17 is a schematic view showing the relationship between the brightness correction effected by parallel grooves and the region shown in FIG. 16 which requires the correction;

FIG. 26A and FIG. 26B are schematic views for explaining the general structure of a conventional side edge type backlight, wherein FIG. 26A is a cross-sectional view thereof and FIG. 26B is a plan view thereof.

DETAILED DESCRIPTION

Figure 3:
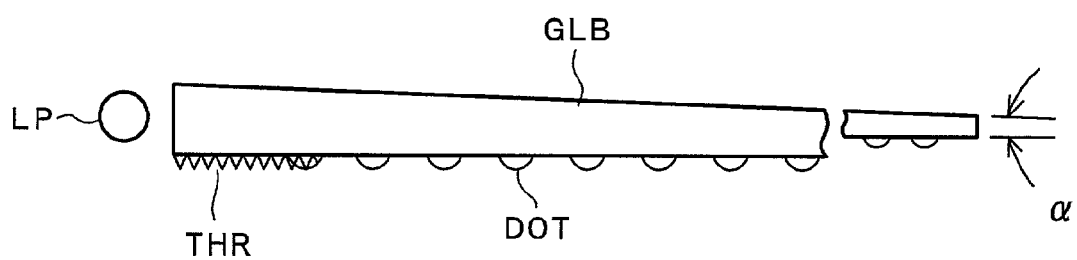
FIG. 3 is a side view of the backlight of the first embodiment of the invention and is a view as seen from the direction of an arrow A of FIG. 2.

Embodiments of the invention are explained hereinafter. First of all, the invention is explained in detail in reference to an embodiment of first means to solve tasks of the invention.

FIG. 1 is a plan view of a backlight for schematically explaining a first embodiment of a liquid crystal display device according to the invention. This backlight includes a light guide plate GLB and a linear lamp (a fluorescent lamp, a cold-cathode ray tube, for example) which is disposed along an incidence plane which is formed on one side of the light guide plate GLB. Tabs SST which are engaged with a mold case not shown in the drawing at the time of assembling the liquid crystal display device as a module so as to suppress the movement of the light guide plate GLB are formed on both sides of the light guide plate GLB.

That is, the light guide plate GLB is formed of a substantially rectangular-shaped acrylic plate and the linear lamp LP is disposed along the lower side in FIG. 1, that is, the incidence plane of the light guide plate GLB. The light guide plate GLB has a wedged cross section which gradually decreases the thickness toward an opposite side which is parallel to the lower side along which the linear lamp LP is disposed (linear-lamp-disposed side). The substantially rectangular light guide plate is defined such that the term includes not only a light guide plate which forms a main surface of the light guide plate facing a liquid crystal display panel in an opposed manner in a rectangular shape or a square shape but also a light guide plate whose corner portions (portions where sides constituting the main surface intersect each other) are subjected to the beveling treatment such as a light guide plate having an octagonal main surface in a strict sense, for example.

As shown in FIG. 1, the tabs SST have inclined surfaces on the engaging sides which are directed to the linear lamp LP. By engaging these tabs SST with recessed portions of a mold case not shown in the drawing at positions corresponding to the tabs SST, the light guide plate GLB is prevented from moving toward the linear lamp LP side. This is because that unless these engaging protrusions are formed, when an impact is applied to the liquid crystal display device from outside, the light guide plate GLB impinges on the linear lamp LP and may rapture the linear lamp LP.

Further, although the linear lamp LP side of the tabs SST may have a shape which erects at a right angle from the light guide plate body, the engaging side of the tabs SST directed toward the linear lamp LP are formed in an inclined surface to increase the impact resistance of the the light guide plate GLB thus preventing the occurrence of the cracks in the light guide plate due to the impact applied thereto.

On surfaces of both ends of the side along which the linear lamp LP is disposed, that is, on the surfaces of corner portions which constitute brightness correction regions HR, a plurality of grooves THR which have an extension direction thereof slanted in the direction toward a center portion of the light guide plate to the side along which the linear lamp LP is disposed (hereinafter, these grooves referred to as a light emission control pattern for the convenience sake) are formed. In other words, a plurality of these grooves are extended in the direction which makes a given angle to the side of the main surface of the light guide plate which extends along the linear lamp LP or the longitudinal direction (extending direction) of the linear lamp LP. These grooves may be formed of V-shaped grooves, flat-bottomed grooves, curved grooves or other grooves having a suitable shape.

The above-mentioned light emission control pattern THR is formed of a combination of a large number of grooves which differ in length. The light emission control pattern THR is formed such that the density of the brightness correction region HR is increased at ends of the corner portions. The grooves to be combined are not limited to one kind.

FIG. 2 is an enlarged view of the corner portion of the light guide plate in FIG. 1. In the drawing, for achieving the reduction in picture frame, the linear lamp LP, size of which is equal to or slightly longer than the size of the side of the light guide plate GLB along the linear lamp LP being disposed thereby is used. Here, AR indicates a display area (effective area) of the liquid crystal panel.

The linear lamp LP is provided with electrodes ELD at both ends thereof and end portions of the electrodes ELD are covered with rubber bushings GB. Although power supply lines are pulled out from these portions, they are omitted from the drawing.

As shown in the drawing, the effective light emission region EL of the linear lamp LP having such a constitution is disposed inside the corner portions of the light guide plate GLB and a non-light emission region NL is disposed outside the effective light emission region EL (between the effective light emission region EL and the end periphery of the light guide plate GLB).

Accordingly, the light quantity which is incident on the corner portions of the light guide plate GLB is decreased and hence, the brightness of the corresponding corner portions of the liquid crystal panel becomes lowered thus giving rise to the brightness irregularity.

The light emission control pattern THR which is formed at the corner portion of the light guide plate GLB is formed in a substantially triangular region (brightness correction region) having the length x taken along the side along which the linear lamp LP is disposed (the side of the light incidence surface) and the lengthy taken along the neighboring side which is perpendicular to the light incidence surface.

Here, the length x is taken such that the length x extends from the non-light emission region NL to the effective light emission region EL of the linear lamp LP by d. The brightness correction region HR is formed by overlapping the first light emission control pattern THR1 which is constituted of long grooves and the second light emission control pattern THR2 which is constituted of short grooves at the end of the corresponding corner portion. An angle made by these grooves and the side along which the linear lamp LP is disposed (hereinafter referred to as an extension angle) is expressed by $\theta$. Accordingly, in the brightness correction region HR, the pattern density of the brightness correction region becomes high at the end of the corresponding corner portion.

To shown an example of the sizes of the above mentioned x, y, $\theta$ and the size of the non-light emission region NL at the left and right corner portions as measured toward the screen of the backlight, they are as follows. That is, they are x: 14 mm, y: 28 mm, $\theta$: 25°, NL: 5.3 mm at the left of the screen, and x: 8 mm, y: 23 mm, $\theta$: 20°, NL: 5.4 mm at the right of the screen.

As described above, the size x of the brightness correction region HR is higher than the non-light emission region NL of the linear lamp LP which faces the light guide plate GLB. The size y is changed corresponding to the shape (thickness, inclination angle of wedged cross section, draft) of the light guide plate GLB and the positional relationship of the linear lamp LP relative to the light incidence surface. This draft means an inclination which is provided to a work piece (light guide plate, for example) for facilitating the removal of the work piece from a mold after the work piece is formed using the mold. In the light guide plate, this inclined surface may be also defined as an angle of the light incidence surface to the surface on which the above-mentioned brightness correction area is formed (surface which faces the linear lamp). After all, the whole size, the arrangement density and the arrangement distribution of the brightness correction region HR may be chosen such that the symmetry in appearance can be obtained on the screen of the liquid crystal panel.

FIG. 3 is a side view of the backlight of the first embodiment of the invention and is a view as seen from the direction of an arrow A in FIG. 2. The light guide plate GLB which constitutes the backlight of the embodiment has a wedged cross section and an inclination angle of the wedged cross section is expressed as $\alpha$. Printed dots DOT are provided to a rear surface (a surface opposite to the surface which faces the liquid crystal panel in an opposed manner) and the bright correction region which is formed on the corner portion of the light guide plate GLB is constituted of the light emission control pattern THR which is made of grooves which are explained in conjunction with FIG. 2. The grooves which constitute the light emission control pattern THR are formed by protruding them from the rear surface of the light guide plate GLB.

According to this embodiment, the distribution of light quantity emitted from the light guide plate can be made uniform so that the occurrence of the brightness irregularity in a plane (display irregularity) of the liquid crystal panel which is caused by the reduction in picture frame can be suppressed.

Figure 4:
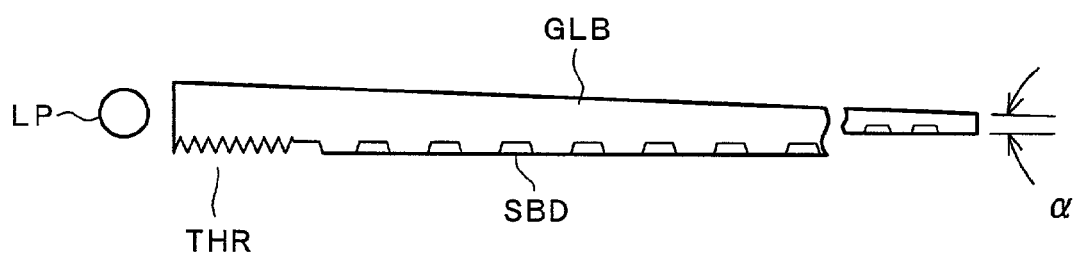
FIG. 4 is a side view of the backlight of a second embodiment of the invention and is a view as seen from the direction of an arrow A of FIG. 2 in the same manner as FIG. 3.

FIG. 4 is a side view of the backlight of the second embodiment of the invention and corresponds to a view as seen from the direction of an arrow A in FIG. 2 as in the case of FIG. 3. The light guide plate GLB which constitutes the backlight of the embodiment also has a wedged cross section provided with an inclination angle $\alpha$.

In this embodiment, granulation SBD formed by a stamper is provided to the rear surface of the light guide plate GLB. The planar shape of the brightness correction region HR formed at the corner portion of the light guide plate GLB is the light emission control pattern THR which is constituted of the grooves explained in conjunction with FIG. 2. However, in this embodiment, the grooves which constitute the light emission control pattern THR are provided by forming recesses in the rear surfaces of the light guide plate GLB so that the grooves which constitute the granulation SBD and the grooves which constitute the light emission control pattern THR can be formed simultaneously.

According to this embodiment also, the distribution of light quantity emitted from the light guide plate can be made uniform so that the occurrence of the brightness irregularity in a plane (display irregularity) of the liquid crystal panel which is caused by the reduction in picture frame can be suppressed.

Figure 5:
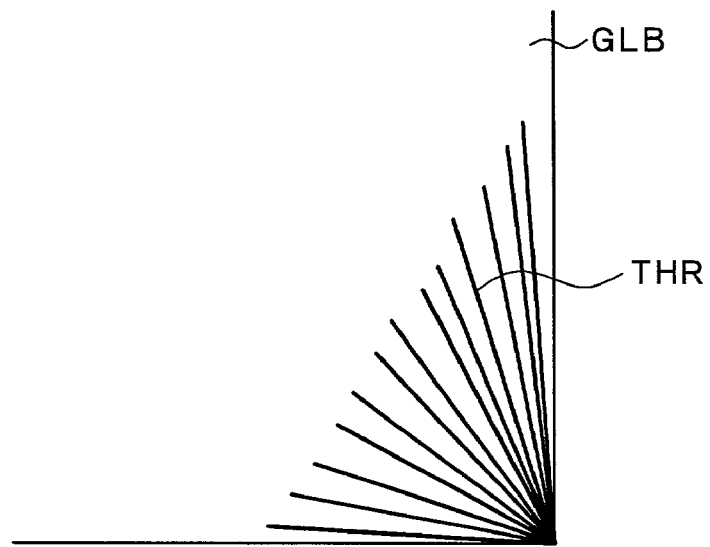
FIG. 5 is a plan view of a corner portion of a light guide plate which constitutes a backlight for explaining a third embodiment of the invention.

FIG. 5 is a plan view of a corner portion of a light guide plate which constitutes a backlight for explaining the third embodiment of the invention. In this embodiment, a light emission control pattern THR which is constituted of grooves forming a brightness correction region HR provided to the corner portion of a light guide plate GLB is formed radially toward a center region of the light guide plate GLB from an end of the corner portion.

Due to such a constitution, the brightness correction region HR exhibits the arrangement density which is high at the end of the corner portion and gradually becomes low toward the center region of the light guide plate GLB. Here, by combining the radially extending grooves which constitute the light emission control pattern THR while changing the lengths of these grooves, for example, by arranging one or a plurality of short grooves between one or a plurality of long grooves, the arrangement density can be arbitrarily adjusted.

According to this embodiment also, the distribution of light quantity emitted from the light guide plate can be made uniform so that the occurrence of the brightness irregularity in a plane (display irregularity) of the liquid crystal panel which is caused by the reduction in picture frame can be suppressed.

Figure 6:
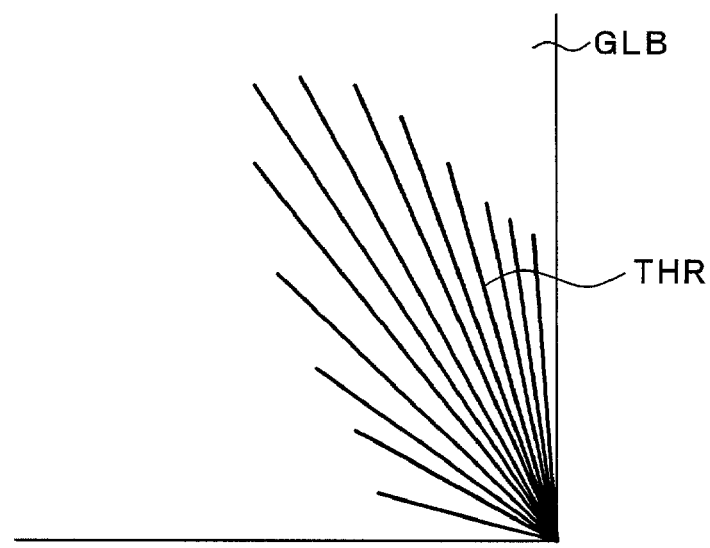
FIG. 6 is a plan view of a corner portion of a light guide plate which constitutes a backlight for explaining a fourth embodiment of the invention.

FIG. 6 is a plan view of a corner portion of a light guide plate which constitutes a backlight for explaining the fourth embodiment of the invention. In this embodiment, grooves which constitute a light emission control pattern THR which forms a bright correction region HR provided to a corner portion of a light guide plate are extended radially toward a center region of the light guide plate GLB from an end of the corner portion. Accordingly, a plurality of grooves THR which are formed on a main surface of the light guide plate GLB appears in a (folding) fan shape which is expanded in the main surface of the light guide plate using an end of the corner portion on the main surface of the light guide plate as a pivot of the fan (as "Ohgi", Japanese Folding Fan). Such a pattern which is constituted of a plurality of these grooves is hereinafter referred to as a fan-shaped light emission control pattern.

Due to such a constitution, it becomes possible to provide the arrangement density of the brightness correction region which is high at the end of the corner portion and gradually becomes low toward the center region of the light guide plate GLB and the arrangement density can be adjusted by changing the shape of the fan.

Further, here, when the fan-shaped brightness correction region is formed as a whole by combining the radially extending grooves which constitute the light emission control pattern THR while changing the lengths of the grooves, the arrangement density can be arbitrarily adjusted by arranging one or a plurality of short grooves between one or a plurality of long grooves.

According to this embodiment also, the distribution of light quantity emitted from the light guide plate can be made uniform so that the occurrence of the brightness irregularity in a plane (display irregularity) of the liquid crystal panel which is caused by the reduction in picture frame can be suppressed.

Subsequently, other constitutional examples of the liquid crystal display device of the invention are explained in conjunction with FIG. 7A to FIG. 8B.

Figure 7A:
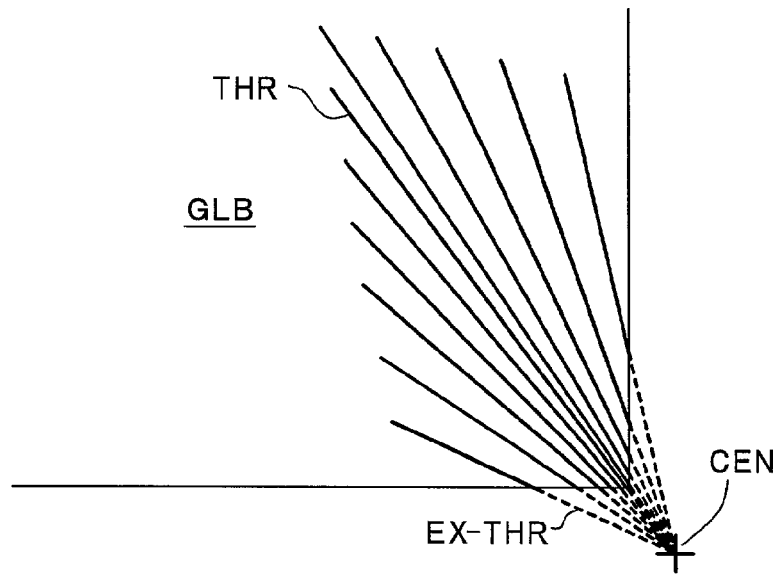
Figure 7B:
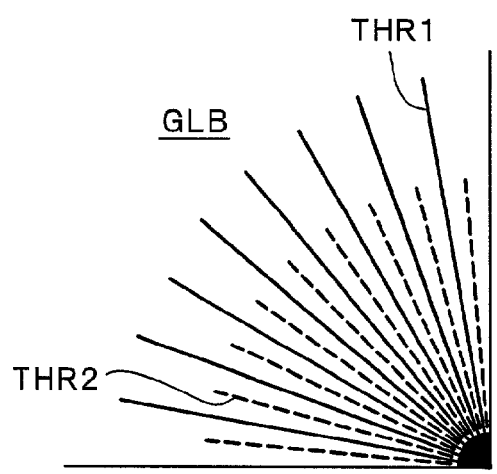
Figure 7C:
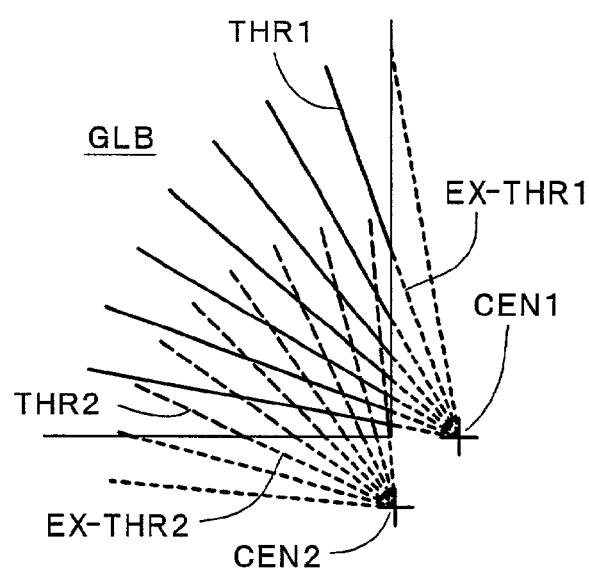

FIG. 7A to FIG. 7C are plan views showing corner portions of light guide plates as modifications based on the third embodiment or the fourth embodiment of the invention. FIG. 7A shows the modification of the brightness correction region HR formed on the upper surface of the light guide plate GLB shown in FIG. 6 and is formed of the fan-shaped light emission control pattern THR constituted of a plurality of grooves which are formed such that the grooves radially extend from an end of a corner portion formed on an upper surface of a light guide plate GLB in the same manner as FIG. 6.

However, in FIG. 7A, the center CEN (the converging point or the intersecting point, or the pivot of a fan in metaphor) of a fan-shape of the light emission control pattern THR consisting of a plurality of grooves is positioned outside an end of the corner portion of the light guide plate GLB.

The above-mentioned center CEN of the fan-shape is determined as an intersecting point of at least two virtual extensions EX-TER (indicated by a dotted line in the drawing) which are formed by extending a plurality of grooves which constitute the fan-shape toward the outside of the corner portion of the light guide plate GLB.

Compared to the constitution of FIG. 6 in which the center CEN of the fan-shape is positioned at the end of the light guide plate GLB, according to the constitution of FIG. 7A, it becomes possible to make the distance between grooves narrow at the end of the light guide plate GLB without making a plurality of grooves interfere with each other.

As other means for narrowing the distance between grooves at the end of the corner portion on the upper surface of the light guide plate GLB, a light emission control pattern THR made of grooves differing in depth may be formed in the vicinity of the end of the corner portion of the light guide plate GLB.

FIG. 7B shows a brightness control region in which a first light emission control pattern THR1 which arranges a plurality of grooves having a first depth in a fan-shape using the end of the corner portion of the light guide plate GLB as a center and a second light emission control pattern THR2 which arranges a plurality of grooves having a second depth which is shallower than the first depth in a fan-shape using the end of the corner portion of the light guide plate GLB as a center are formed together.

Although it is desirable to make the grooves of the light emission control pattern THR which constitutes the brightness correction region deep to achieve the object of the invention, the provision of the deep grooves in a fan-shape is liable to generate the interference between the grooves and hence, particularly, the number of grooves which can be formed in the vicinity of the end of the corner portion of the light guide plate GLB is restricted.

However, the provision of the light emission control pattern which forms the deep grooves and the shallow grooves in combination is preferable as means for giving a complementary brightness correction function in a region where it is difficult to form a plurality of deep grooves.

The constitution shown in FIG. 7B can perform the more effective brightness correction by applying the constitution to the shapes of the light emission control patterns of the brightness correction regions which are explained in conjunction with FIG. 5 and FIG. 6. Further, although the grooves which constitute the second light emission control pattern THR2 are shown in a dashed line in FIG. 7B, the actual grooves may be formed continuously or intermittently. Further, the shapes of a plurality of grooves which constitute the first light emission control pattern THR1 can be formed in the same manner as the second light emission control pattern THR2.

FIG. 7C shows a constitution which combines the features of the light emission control patterns which have been respectively explained in conjunction with FIG. 7A and FIG. 7B. That is, a plurality of grooves which constitute a first light emission control pattern THR1 in FIG. 7C are formed such that they intersect at an intersecting point CEN1 where respective extensions EX-THR1 thereof virtually extend toward the outside of a corner portion of a light guide plate GLB, while a plurality of grooves which constitute a second light emission control pattern THR2 in FIG. 7C are formed such that they intersect at an intersecting point CEN2 where respective extensions EX-THR2 thereof virtually extend toward the outside of the corner portion of the light guide plate GLB.

Although the respective grooves are formed such that the intersecting point CEN1 of the grooves of the first light emission control pattern THR1 and the intersecting point CEN2 of the grooves of the second light emission control pattern THR2 are respectively positioned outside the light guide plate GLB in FIG. 7C, the intersecting point of grooves of either one of the first light emission control pattern THR1 and the second light emission control pattern THR2 which form these brightness correction regions may be formed at the end of the corner portion of the light guide plate GLB or on the upper surface of the light guide plate GLB (in the inside of the corner portion of the light guide plate from the end of the corner portion).

In FIG. 7C, since two kinds of grooves which have the different intersecting points are formed on the upper surface of the light guide plate GLB, two kinds of grooves intersect each other at the corner portion of the light guide plate GLB. However, the grooves can be formed at a high density at the corner portion on the upper surface of the light guide plate GLB in FIG. 7C and hence, the brightness correction region having the distribution which exhibits the high arrangement density at the end of the corner portion and the arrangement density which gradually decreases toward the center region of the light guide plate GLB can be formed. Accordingly, the distribution of light quantity emitted from the light guide plate can be made uniform so that the occurrence of brightness irregularity in a display plane (display irregularity) which is caused by the reduction of the picture frame can be suppressed.

Figure 8A:
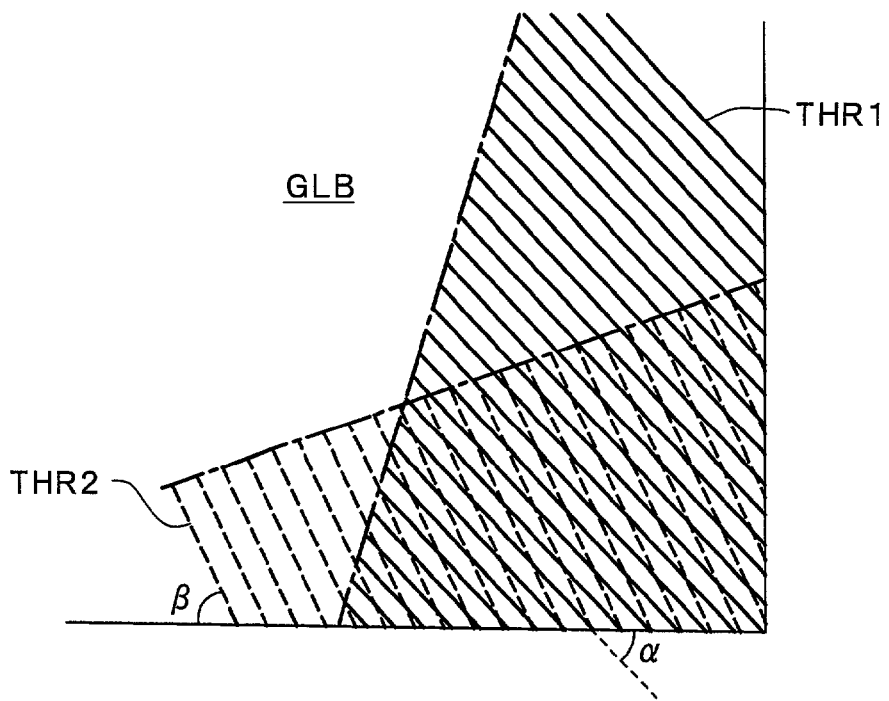
Figure 8B:
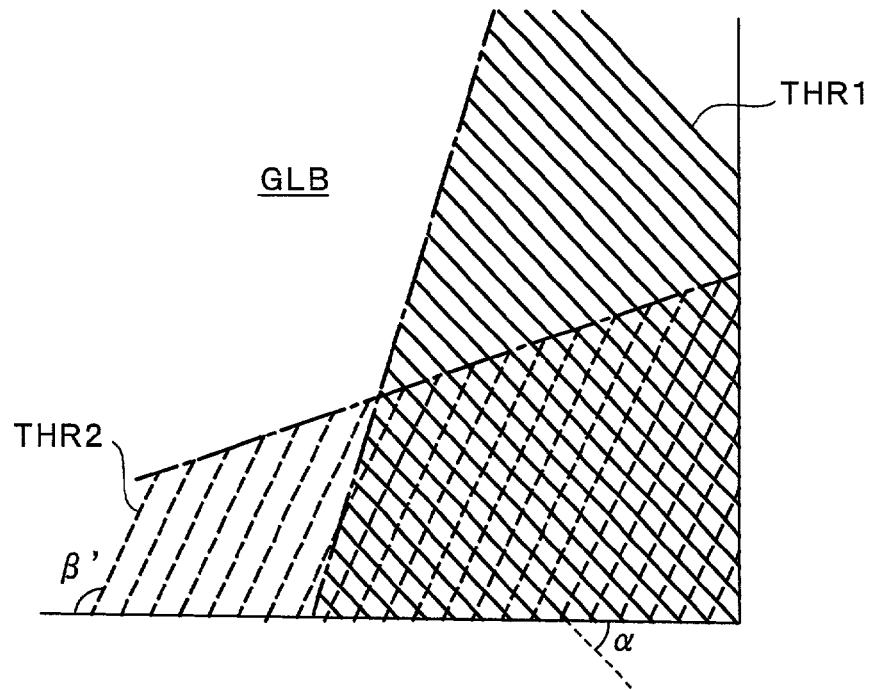

FIG. 8A and FIG. 8B are plan views showing corner portions of light guide plates as other modifications based on the third and the fourth embodiment of the invention. These constitutions form, as other modifications which form light emission control patterns differing in kinds of grooves, brightness control regions each of which includes a first light emission control pattern THR1 which arranges a plurality of grooves making a first extension angle α to one side of the light guide plate GLB and a second light emission control pattern THR2 which arranges a plurality of grooves making a second extension angle β to one side of the light guide plate GLB which is different from the first extension angle α.

The constitution shown in FIG. 8A is comprised of the grooves which constitute the first light emission control pattern THR1 and have the first extension angle α which is an intersecting angle between the grooves and the side along which the linear lamp LP is disposed, and the grooves which constitute the second light emission control pattern THR2 and have the second extension angle β which is an intersecting angle between the grooves and the side along which the linear lamp LP is disposed. This extension angle β is set to $0° \leq \beta \leq 90°$, preferably an acute angle ($0° < \beta < 90°$) in the clockwise direction to the side along which the linear lamp LP is disposed and is an angle which intersects the grooves of the first light emission control pattern THR1.

The constitution shown in FIG. 8B is comprised of the grooves which constitute the first light emission control pattern THR1 and have the first extension angle α which is an intersecting angle between the grooves and the side along which the linear lamp LP is disposed, and the grooves which constitute the second light emission control pattern THR2 and have the second extension angle β' which is an intersecting angle between the grooves and the side along which the linear lamp LP is disposed. This extension angle β' is set to $90° \leq \beta' \leq 180°$, preferably an obtuse angle ($90° < \beta' < 180°$) in the clockwise direction to the side along which the linear lamp LP is disposed and is an angle which intersects the grooves of the first light emission control pattern THR1.

Here, the first extension angle α in the above-mentioned FIG. 8A and FIG. 8B is set to $0° \leq \alpha \leq 90°$, preferably $0° < \alpha < 90°$ in the clockwise direction to the side along which the linear lamp LP is arranged and is an angle which intersects the grooves of the second light emission control pattern THR2.

In the above-mentioned constitutions shown in FIG. 8A and FIG. 8B, with respect to the first extension angle α and the second extension angle β or β', by setting one of these angles to an acute angle and the other angle to an obtuse angle, an uneven pattern which has a high arrangement density in the vicinity of the end of the corner portion of the light guide plate GLB can be formed.

The grooves which constitute the first light emission control pattern THR1 and the grooves which constitute the second light emission control pattern THR2 form an overlapped region by intersecting each other at the end side of the corner portion of the light guide plate GLB. As a result, on the upper surface of the corner portion of the light guide plate GLB, an uneven pattern which appears to be a pattern formed by a so-called knurling can be formed.

The lateral size (the length along the side along which the linear lamp is disposed) and the longitudinal size of the light guide plate GLB in the above-mentioned respective embodiments are set to 288.1 mm and the 217.3 mm respectively, for example. Further, the thickness of a light incidence plane which constitutes the side along which the linear lamp is disposed is set to 2.2 mm, for example, while the thickness of the side which is opposite to the light incidence plane is set to 0.6 mm, for example. By adhering end surface tapes having a thickness of 0.15 mm, for example, to the lateral sides (sides on which the tabs SST are formed) of the light guide plate GLB, the light which propagates in the inside of the light guide plate GLB can be effectively utilized.

Subsequently, embodiments of the second means for solving the task of the invention which can make the brightness irregularity in the corner portion of the light guide plate more uniform by developing the constitution of the above-mentioned light emission control pattern is explained in detail hereinafter.

Figure 9:
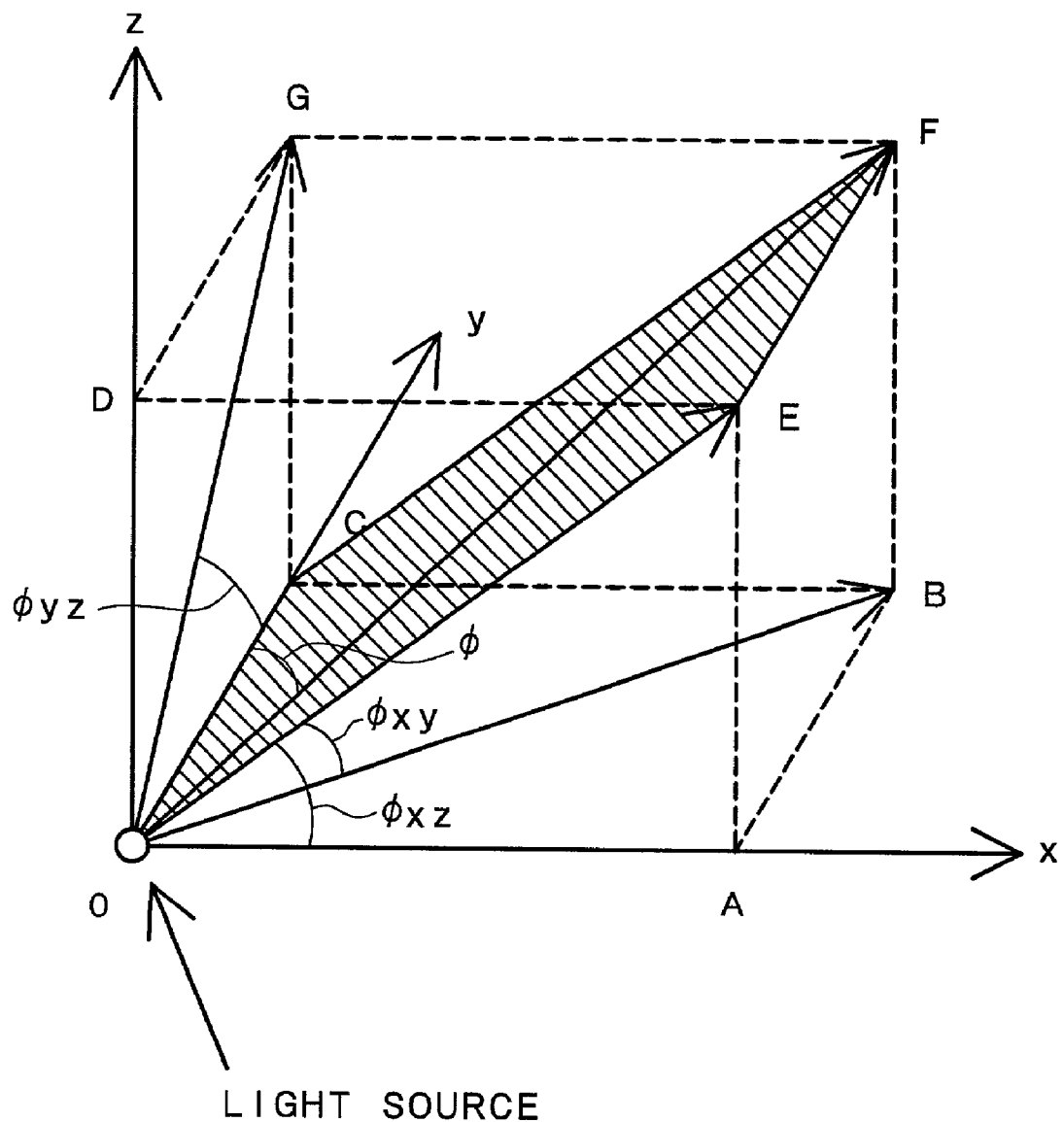
FIG. 9 is an explanatory view of a three dimensional coordinates system for defining a solid angle which predicts the arrival strength of an incident light to a light guide plate for explaining the second means for solving the task of the invention.

FIG. 9 is an explanatory view of a three dimensional coordinates system for defining a solid angle which predicts the arrival strength of an incident light to a light guide plate for explaining the second means for solving the task of the invention. In the coordinates system shown in FIG. 9, an x axis, a y axis and a z axis respectively indicate the lateral direction, the longitudinal direction and the thickness direction of the light guide plate (explained as an acrylic plate hereinafter).

When a single light source (a spot light source) is placed on an origin O of this coordinates, the light which is emitted from the single light source along a vector F can be expressed by two angles, that is, an angle (an expansion angle φ) to the y axis and an angle (rotation angle φxz) which a plane which passes the y axis and includes the progressing direction of the light (indicated as a parallelogram OCFE which is drawn with hatching in FIG. 9) makes to the x axis. In FIG. 9, assuming the expansion angle φ in the progressing direction of the light as $\phi = \angle FOC$ ($0° \leq \phi \leq 90°$)

the rotation angle φxz to an xy plane as $\phi xz = \angle EOA$ ($0° \leq \phi xz \leq 360°$) the vertical angular component φyz to the xy plane as $\phi yz = \angle GOC$ (wedged cross-sectional angle)

the angular component φxy to the xy plane as $\phi xy = \angle BOC$ (planar angle)

$OA = OE \cdot \cos \phi xz = OF \cdot \sin \phi \cdot \cos \phi xz$ $OC = OF \cdot \cos \phi$ $\tan \phi xy = OA/OC = \sin \phi \cdot \cos \phi xz / \cos \phi = \tan \phi \cdot \cos \phi xz$ $\therefore \phi xy = \tan^{-1} (\tan \phi \cdot \cos \phi xz)$ $OD = OE \cdot \sin \phi xz = OF \cdot \sin \phi \cdot \sin \phi xz$ $OC = OF \cdot \cos \phi$ $\tan \phi yz = OD/OC = \sin \phi \cdot \sin \phi xz / \cos \phi = \tan \phi \cdot \sin \phi xz$ $\therefore \phi yz = \tan^{-1} (\tan \phi \cdot \sin \phi xz)$ Although the expansion angle determines the transmissivity and the refractive index at the time of incidence to the light guide plate, the rotation angle is common between the air layer and the light guide plate. Accordingly, the equi-intensity distribution of light which progresses in the inside of the light guide plate extremely resembles a two-stage conical shape which has a single light source at a peak point and changes a peak angle at a boundary surface between the air layer and the light guide plate.

FIG. 10 is an explanatory view which sums up a result obtained by analyzing the relationship among the expansion angle between an air layer and a light guide plate, a wedged cross-sectional angle and a planar angle to a rotation angle in the coordinates system of FIG. 9 in a table. In the drawing, the light guide plate is shown as an acrylic layer and an angle of the acrylic layer is affixed with "'".

Figure 11:
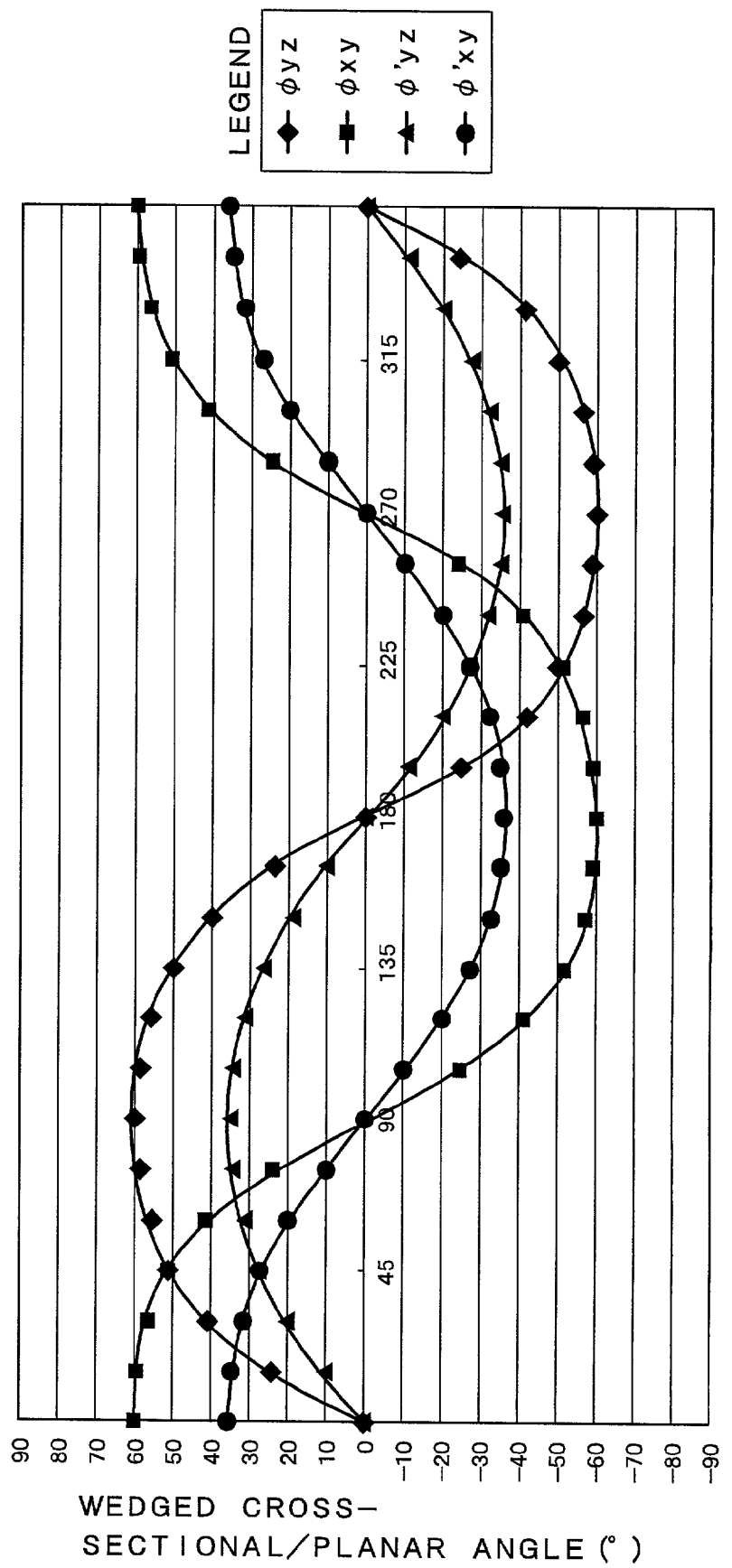
FIG. 11 is an explanatory view showing the result of analysis in FIG. 10, wherein a solid angle at the expansion angle $\phi=60°$ inside an air layer-the light guide plate (acrylic layer) is shown as a graph.

FIG. 11 is an explanatory view showing the result of analysis in FIG. 10, wherein the relationship (solid angle) among the wedged cross-sectional angle φyz, the planar angle φxy and the rotation angle φxz at the expansion angle φ=60° in the inside of the air layer—the acrylic layer is shown as a graph. In the drawing, the wedged cross-sectional angle (°) and the planar angle (°) at the air layer and the acrylic layer are taken on the ordinate and the rotation angle (°) is taken on the abscissa.

Based on the above-mentioned analysis, the equi-intensity (equi-transmissivity) of the light at the acrylic layer which is incident on the light guide plate (acrylic layer) from the air layer is explained.

Figure 12:
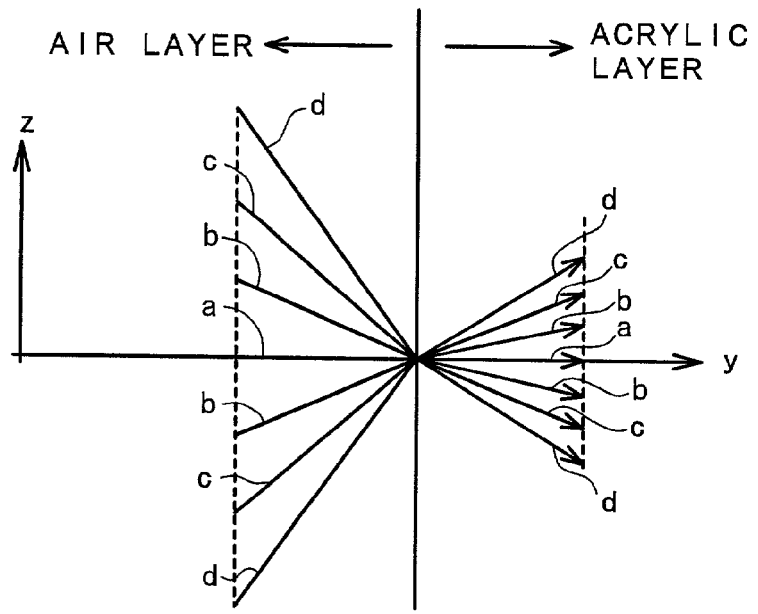
FIG. 12 is a schematic view for explaining the progress of light of equi-transmissivity which is incident on the light guide plate (acrylic layer) from the air layer on the wedged cross section.
Figure 13:
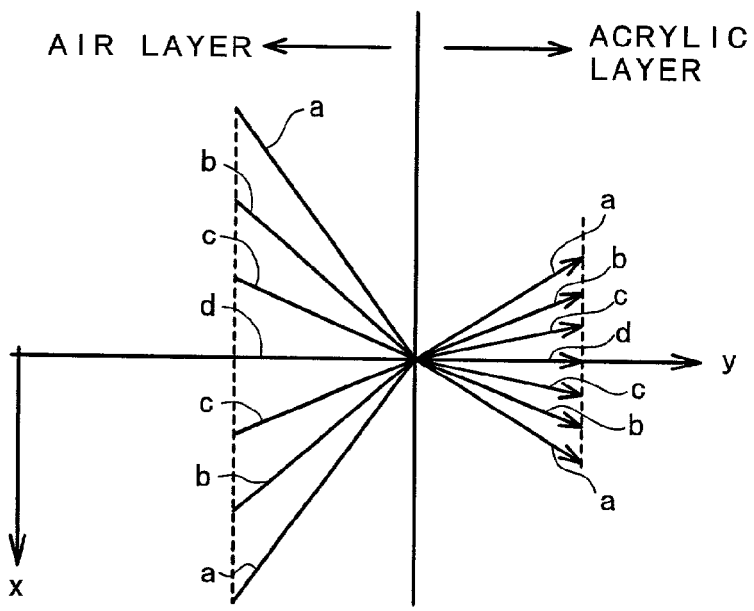
FIG. 13 is a schematic view for explaining the progress of light of equi-transmissivity which is incident on the light guide plate (acrylic layer) from the air layer on a plane.

FIG. 12 is a schematic view for explaining the progress of light of equi-transmissivity on the wedged cross section which is incident on the light guide plate (acrylic layer) from the air layer. Further, FIG. 13 is a schematic view for explaining the progress of the light of equi-transmissivity on the plane which is incident on the light guide plate (acrylic layer) from the air layer. Same symbols used in FIG. 12 and FIG. 13 indicate the identical progress directions of lights.

It can be understood from FIG. 12 and FIG. 13 that the greater the light expands in the plane, the expansion of the light on the wedged cross section becomes lower.

FIG. 14A an FIG. 14B are explanatory views for showing the distribution of light of equi-intensity which is emitted from one point of a linear lamp and progresses in the inside of the light guide plate, wherein FIG. 14A is a schematic cross-sectional view of the light guide plate and FIG. 14B is a schematic plan view of the light guide plate. Same symbols used in these drawings indicate the identical progress directions of lights.

As mentioned previously, since the equi-intensity distribution of light is similar to the two-staged cone, the equi-intensity distribution on the plane corresponds to a peripheral portion of the cross-sectional shape on a pattern surface of the cone, wherein it is considered that the intensity is liable to be increased at a region sandwiched by curves and is liable to be weakened outside the region.

Figures 15A, 15B:
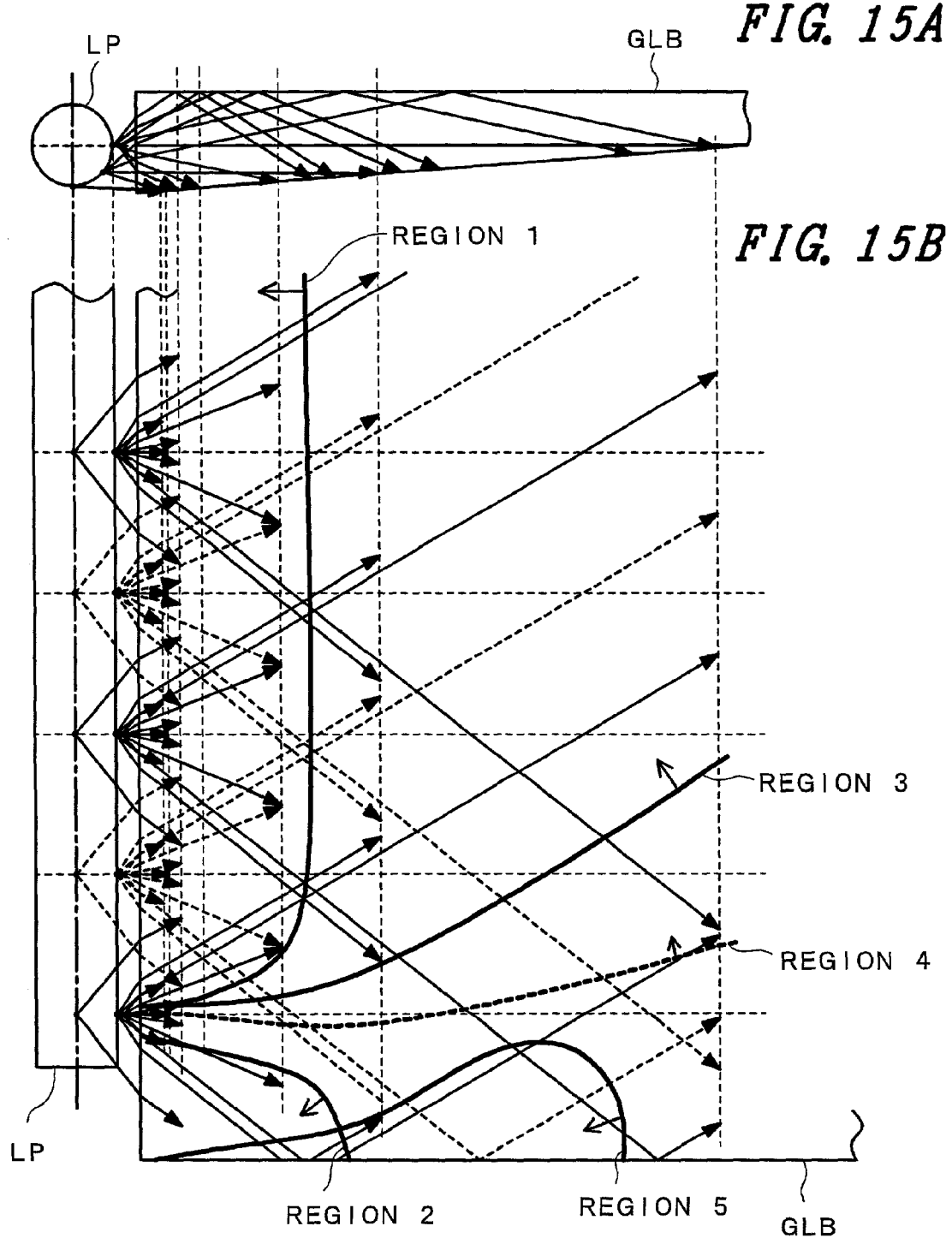

FIG. 15A and FIG. 15B are schematic views for explaining the progress of lights which are emitted from a plurality of points of the linear lamp and a incident on the light guide plate and show the corner portion of the light guide plate. With respect to these drawings, FIG. 15A is a schematic cross-sectional view of the light guide plate and FIG. 15B is a schematic plan view of the light guide plate.

A region 1 indicates an incidence surface side disposed in an effective light emission region EL of a linear lamp LP, a region 2 is a dark portion at a corner portion of a light guide plate GLB which includes a problem, a region 3 is an originally bright (highly luminous) region due to light incident from the effective light emission region EL of the linear lamp LP, a region 4 is a region which promotes the brightness by reflection on a side surface (a mirror surface) of the light guide plate GLB, and a region 5 is a region which decreases the brightness by reflection on a side surface (mirror surface) of the light guide plate GLB.

Here, although there is no distinct difference between brightness of respective regions, the difference is within a range that can be visually sensed and these regional portions are indicated by arrows.

In FIG. 15A and FIG. 15B, with respect to the region 2 which constitutes the dark portion of the corner portion of the light guide plate GLB where the lack of the brightness becomes a problem, since end portions (non-light emission regions) of ends of the linear lamp LP are within the length of the side which faces the light guide plate GLB in an opposed manner and hence, only a slight amount of light is incident on the dark portions. On the other hand, since the light emitted from a plurality of points of the linear lamp reach the region 1 within the length of the side which faces the effective light emission region of the linear lamp LP, the region 1 becomes bright. As a result, the darkness of the region 2 is promoted.

At a position slightly away from the incidence surface of the light guide plate GLB, among lights which are incident on the incidence surface of the light guide plate GLB, the light which progresses toward the lateral side surfaces of the light guide plate GLB returns toward a center portion of the light guide plate GLB by a total reflection on the corresponding lateral side surfaces.

Accordingly, it is considered that the region 3 disposed in the inside of the originally bright effective light emission region of the linear lamp LP complements the region 4 with light by the total reflection on the lateral side surfaces so that the lowering of the brightness of the slightly dark region 5 is promoted.

FIG. 16 is an explanatory view of a region which requires the correction at the corner portion of the light guide plate. In the drawing, a region depicted by a dotted line indicates a region which requires the correction and is formed by synthesizing the above-mentioned region 2 and 5.

The region which requires such a correction gives rise to following tasks to be solved when compared with the brightness correction performed only with grooves which is explained in conjunction with the first to fourth embodiments of the invention.

FIG. 17 is a schematic view which shows the relationship between the brightness correction effected by parallel grooves and the region shown in FIG. 16 which requires the correction. As shown in FIG. 17, to compare the correction region effected by the parallel grooves (here, V-shaped grooves) and the region shown in FIG. 16 which requires the correction, it is understood that there exist a portion where the correction is excessive and a portion where the correction is in short. In the drawing, the portion which is drawn with an rightwardly lowering hatching indicates the portion where the correction is excessive and the portion which is drawn with dots indicates the portion where the correction is in short.

Based on the result of the above-mentioned analysis, the second means of the invention adopts the constitution which is explained in a following embodiment.

Figure 18:
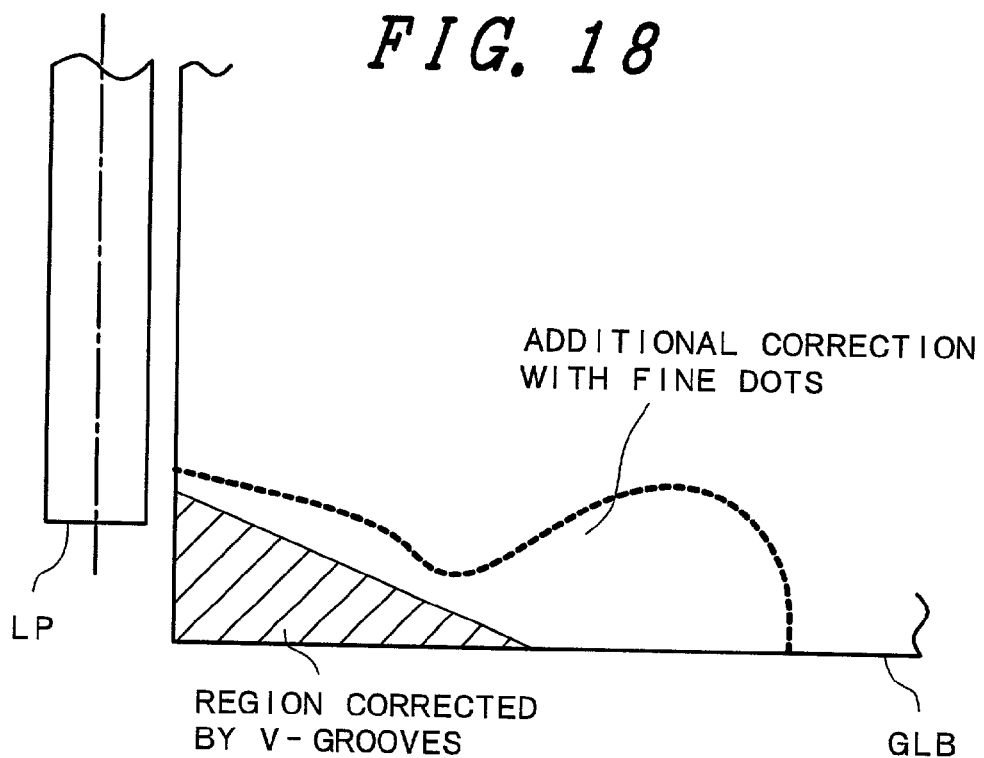
FIG. 18 is a plan view of the corner portion of the light guide plate which constitutes a backlight for explaining the fifth embodiment of the invention.

FIG. 18 is a plan view of a corner portion of a light guide plate which constitutes a backlight for explaining the fifth embodiment of the invention. In this embodiment, V-shaped grooves are formed at an end of the corner portion of the light guide plate GLB and fine dots area added to the region which requires the correction shown in FIG. 16 so as to form a composite light emission control pattern.

These fine dots can be formed by processing grooves similar to those of the first means on a given portion of a stamper which produces the light guide plate by means of cutting or the like and further by processing fine dots on the surface of the groove forming region. Alternatively, these fine dots can by realized by performing the surface roughening treatment by sand blast processing or a sandpaper on the groove forming region after processing the grooves. Further, these fine dots can be realized by forming the grooves on the light guide plate and thereafter performing the surface roughening treatment on the light guide plate by sandblasting or a sand paper. Here, a portion or the whole of the fine dots may be overlapped to the groove portion.

These grooves are not limited to V-shaped grooves and may be flat-bottomed grooves or curved surface grooves or may take any other suitable shape as has been explained in the above-mentioned first to fourth embodiments. Further, as shown in FIG. 1, it may be possible to form other grooves which differ in length (or depth) between the grooves. The same goes for embodiments described hereinafter.

The above-mentioned composite light emission control pattern can be used along with the light guide plate to which the dot printing (printing dot pattern) or the irregular (granulated pattern) treatment which have been known conventionally is applied.

Due to such a constitution, the distribution of light quantity emitted from the light guide plate can be made more uniform so that the occurrence of brightness irregularity in a plane (display irregularity) of the liquid crystal panel can be suppressed.

Figure 19:
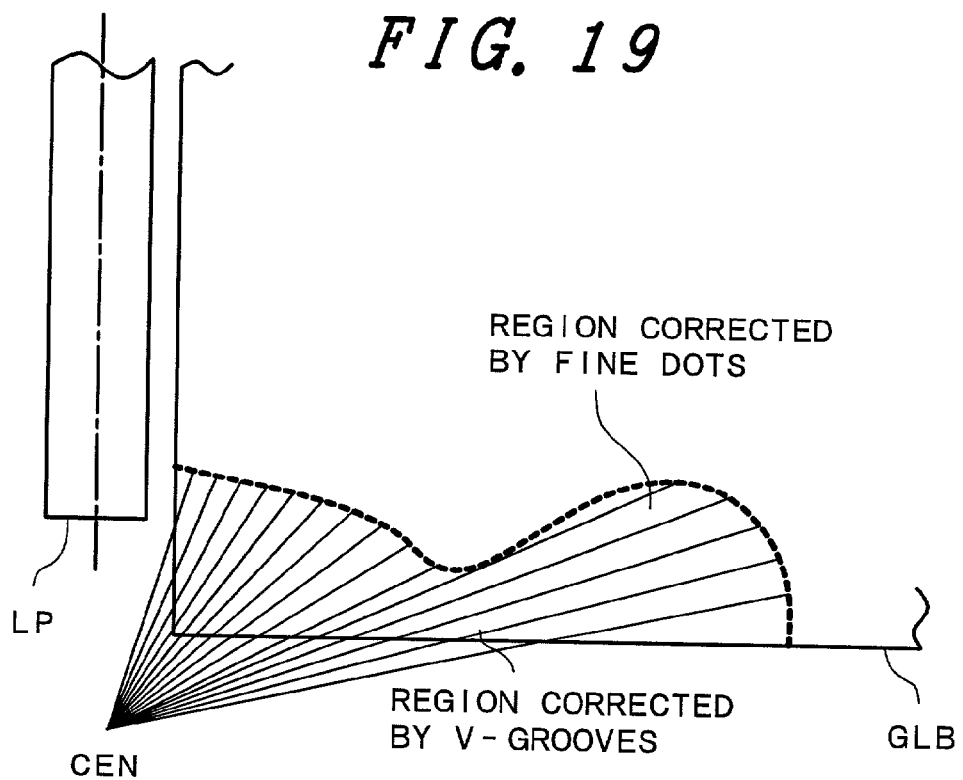
FIG. 19 is a plan view of the corner portion of the light guide plate which constitutes a backlight for explaining the sixth embodiment of the invention.

FIG. 19 is a plan view of a corner portion of a light guide plate which constitutes a backlight for explaining a sixth embodiment of the invention. In this embodiment, a composite light emission control pattern is formed by combining fan-shaped grooves constituting of a plurality of grooves which are explained in conjunction with the above-mentioned FIG. 7A to FIG. 7C and fine dots. A correction region formed of the fine dots is overlapped with a correction region formed of the fan-shaped grooves (V-shaped grooves in the drawing).

That is, the center CEN of the fan-shaped grooves is positioned outside an end of the corner portion of the light guide plate GLB. The center CEN of the fan-shaped grooves is determined as an intersecting point of at least two virtual extensions which are performed by extending a plurality of grooves which constitute this fan-shape toward the outside of the corner portion of the light guide plate GLB.

Here, as means to narrow the distance between the grooves at the end of the corner portion formed on an upper surface of the light guide plate GLB, grooves which differ in depth may be formed in the vicinity of the end of the corner portion of the light guide plate GLB.

The composite light emission control pattern can be used along with the light guide plate to which the dot printing (printing dot pattern) or the irregular (granulated pattern) treatment which have been known conventionally is applied.

Due to this embodiment, the distribution of light quantity emitted from the light guide plate can be made more uniform so that the occurrence of brightness irregularity in a plane (display irregularity) of the liquid crystal panel can be suppressed.

Figure 20:
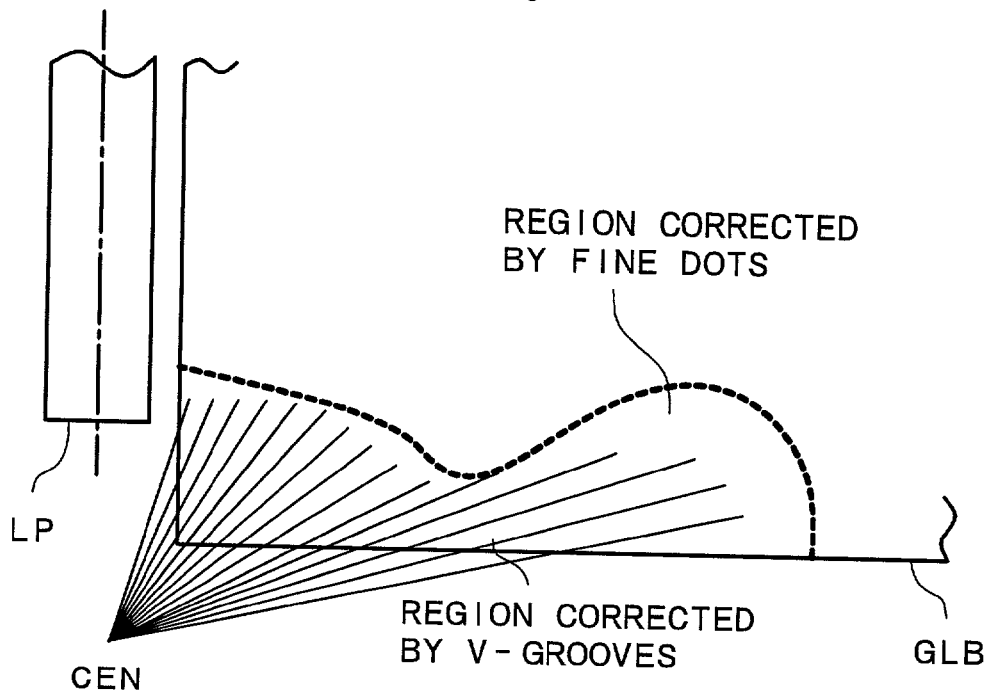
FIG. 20 is a plan view of the corner portion of the light guide plate which constitutes a backlight for explaining the seventh embodiment of the invention.

FIG. 20 is a plan view of a corner portion of a light guide plate constituting a backlight for explaining the seventh embodiment of the invention. In this embodiment, without overlapping grooves on a whole surface of a correction region formed of fine dots, a boundary between a correction region formed of fan-shaped grooves (V-shaped grooves in the drawing) and other portion is blurred so as to decrease the brightness difference. Here, it is desirable to perform the brightness control by overlapping a portion or the whole surface of the correction region formed of the fine dots to the groove forming region.

Figure 21:
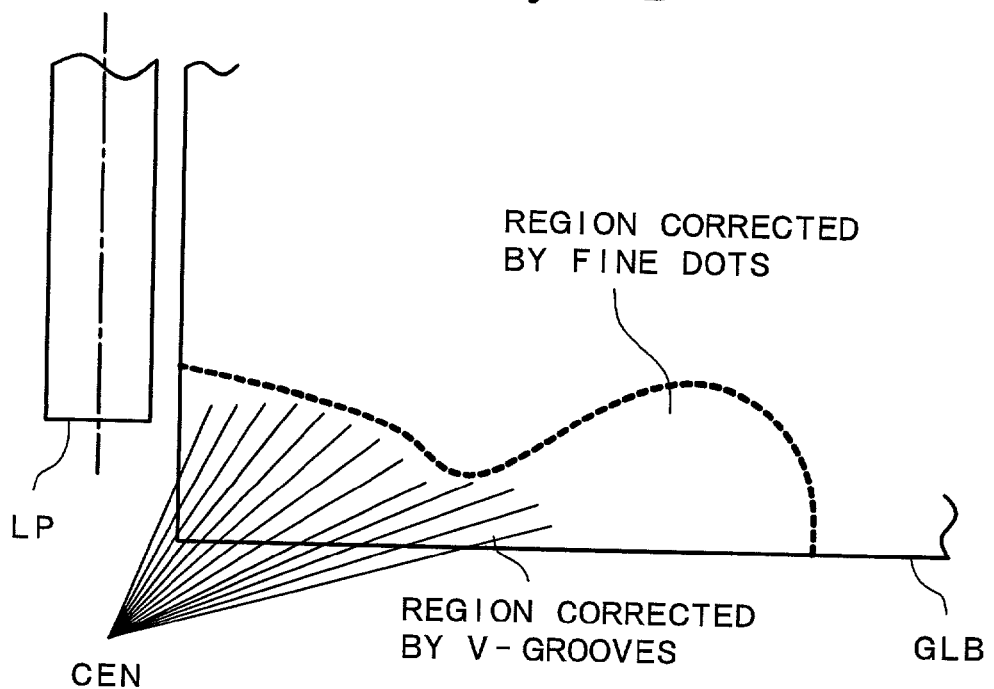
FIG. 21 is a plan view of the corner portion of the light guide plate which constitutes a backlight for explaining a modification of the seventh embodiment of the invention.

FIG. 21 is a plan view of a corner portion of a light guide plate constituting a backlight for explaining a modification of the seventh embodiment of the invention. According to this modification, in the constitution of FIG. 20 where the fan-shaped grooves (V-shaped grooves in the drawing) are not overlapped with a whole surface of a correction region formed of fine dots so as to blur the brightness difference of the correction region, a major portion of the fan-shaped groove in FIG. 20 is provided to an end of the corner portion of the light guide plate GLB thus enlarging the correction region formed of the fine dots.

In this embodiment, the brightness correction of the corner portion of the light guide plate GLB is performed by controlling a formation quantity (density, size and the like) of the fine dots and hence, the brightness difference at the region of the corner portion where the correction is necessary can be decreased.

Due to this embodiment also, the distribution of light quantity emitted from the light guide plate can be made more uniform so that the occurrence of brightness irregularity in a plane (display irregularity) of the liquid crystal panel can be suppressed.

Subsequently, other constitutional examples of the liquid crystal display device to which the above-mentioned embodiments of the invention are applied are explained in conjunction with FIG. 22 to FIG. 25.

Figure 22:
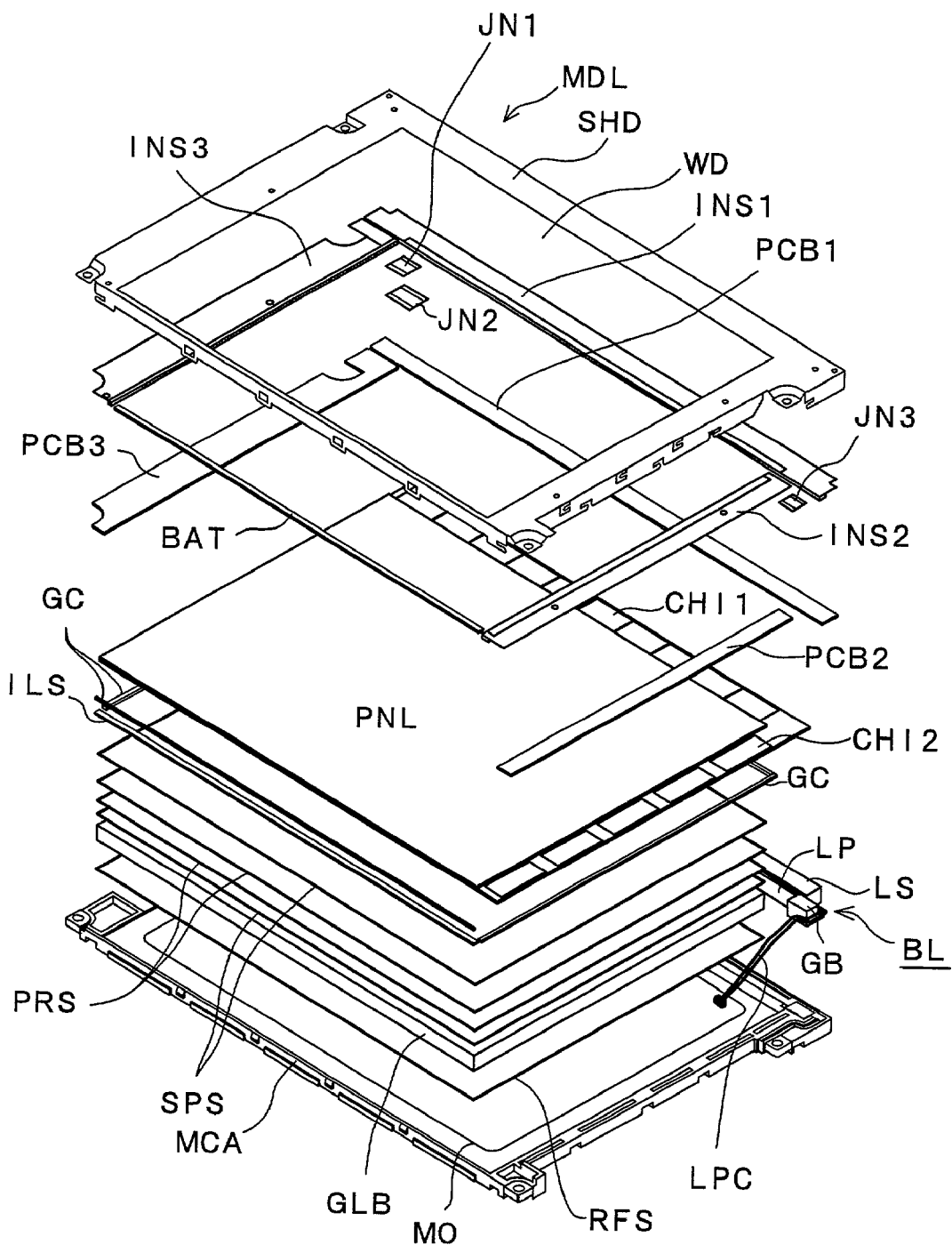
FIG. 22 is a developed perspective view for explaining an entire constitutional example of a liquid crystal display device according to the invention.

FIG. 22 is a developed perspective view for explaining an overall constitutional example of the liquid crystal display device according to the invention. This drawing is provided for explaining a specific structure in which a liquid crystal panel PNL and a light guide plate GLB which constitutes a backlight are sandwiched between a metal frame (metal-made shield casing) SHD and a mold casing (lower casing) MCA and these parts are integrated to form a module: MDL. This liquid crystal panel is of a thin film transistor type.

In the drawing, WD indicates a display window, INS 1–3 indicate insulation sheets, PCB 1–3 indicate circuit boards (PCB 1 being a drain-side circuit board: a drive circuit board of an image signal wiring, PCB 2 being a gate-side circuit board: a drive circuit board of a scanning electrode wiring, PCB 3 being an interface circuit board), JN 1–3 indicate joiners for electrically connecting circuit boards PCB 1–3, CH 11 indicates an image signal electrode drive circuit which is directly mounted on a thin film transistor substrate, CH 12 indicates a scanning electrode drive circuit which is directly mounted on the substrate in the same manner, PNL indicates a liquid crystal panel, GC indicates a rubber cushion, ILS indicates a light shielding spacer. PRS indicates a prism sheet, SPS indicates a diffusion sheet, GLB indicates a light guide plate, RFS indicates a reflection sheet, MCA indicates a lower casing (mold frame) which is formed by integral molding, MO is an opening of the MCA, LP indicates a linear lamp (cold-cathode fluorescent lamp), LPC indicates a lamp cable, GB indicates a rubber bushing for supporting the linear lamp LP, BAT indicates a W-surface adhesive tape, BL indicates a backlight BL constituting of the light guide plate, the linear lamp and the like. The liquid crystal display module MDL is assembled by laminating diffusion plate members in the arrangement relationship shown in the drawing.

The liquid crystal display module MDL includes two kinds of accommodating/holding members consisting of the lower casing MCA and the shielding casing SHD. The metal-made shield casing SHD which accommodates and fixes the insulation sheets INS 1–3, the circuit boards PCB 1–3 and the liquid crystal panel PNL and the lower casing MCA which accommodates the backlight BL consisting of the linear lamp LP, the light guide plate GLB, the prism sheet PRS and the like are integrally merged.

On the interface circuit board PCB 3, an integrated circuit chip which receives video signals from an external host computer and receives control signals such as timing signals or the like and a timing converter TCON which generates clock signals by processing timing, and the like are mounted.

In FIG. 22, although a so-called COG method in which the drive circuits (integrated circuits CH 1, CH 2) of the liquid crystal panel are directly mounted on the thin film transistor substrate is explained, the invention is not limited to the liquid crystal panel of this mounting method and is applicable in the same manner to a conventional method which mounts using a TCP (Tape Carrier Package).

Figure 23:
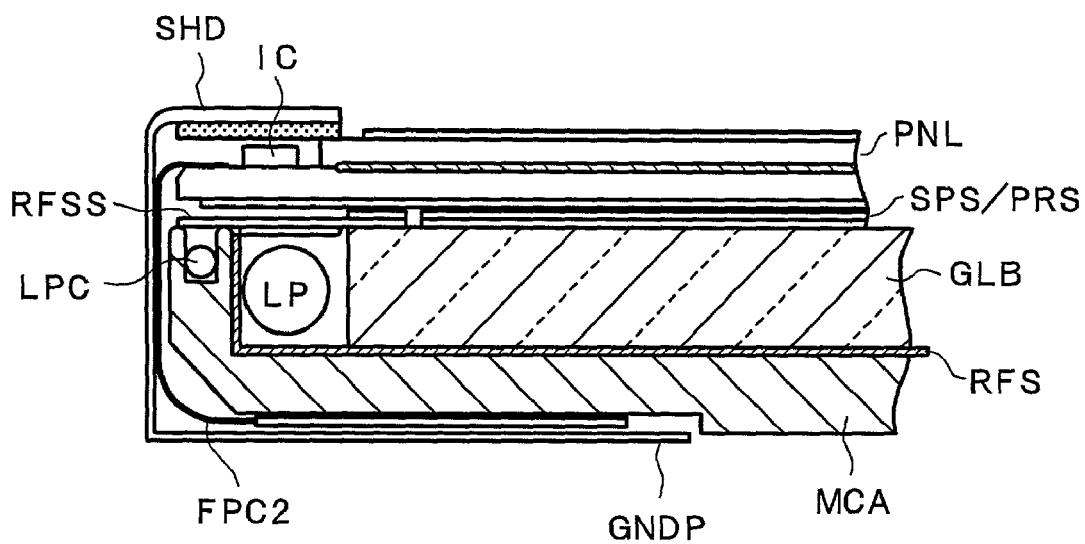
FIG. 23 is a cross-sectional view of an essential part for explaining a backlight mounting structure of the liquid crystal display device according to the invention.

FIG. 23 is a cross-sectional view of an essential part for explaining a backlight mounting structure of a liquid crystal display device according to the invention. The liquid crystal display device is constituted by laminating and fixing the liquid crystal panel PNL, the light guide plate GLB, the metal frame SHD and the mold casing MCA.

Polarizers are adhered to both surfaces of the liquid crystal panel PNL and an optical sheet SPS/PRS consisting of the diffusion sheet and the prism sheet is inserted between the liquid crystal panel PNL and the light guide plate GLB. The light guide plate GLB is held by the mold casing MCA and the reflection sheet RFS is mounted on the rear surface of the light guide plate GLB.

Although the lamp reflection sheet LS and the reflection sheet RFS are provided as separate parts in the above-mentioned FIG. 22, in the structure shown in the FIG. 23, the reflection sheet RFS is bent to a lower surface of the linear lamp LP and a side surface opposite to the light guide plate GLB so that the reflection sheet RFS also has a function as a lamp reflection plate of the linear lamp LP. A reflection sheet RFSS is provided above the linear lamp LP as a separate part.

A lamp cable LPC is pulled around in a groove formed in the mold casing MCA and is pulled out to the outside together with a lamp cable at the high voltage side.

A flexible printed board FPC 2 is bent from a drive IC which is mounted on the liquid crystal panel PNL to the rear surface of the mold casing MCA and is fixedly secured in the above-mentioned structure. Then, a ground pad thereof is grounded to the metal flame SHD through a conductive foil GNDP.

Figure 24:
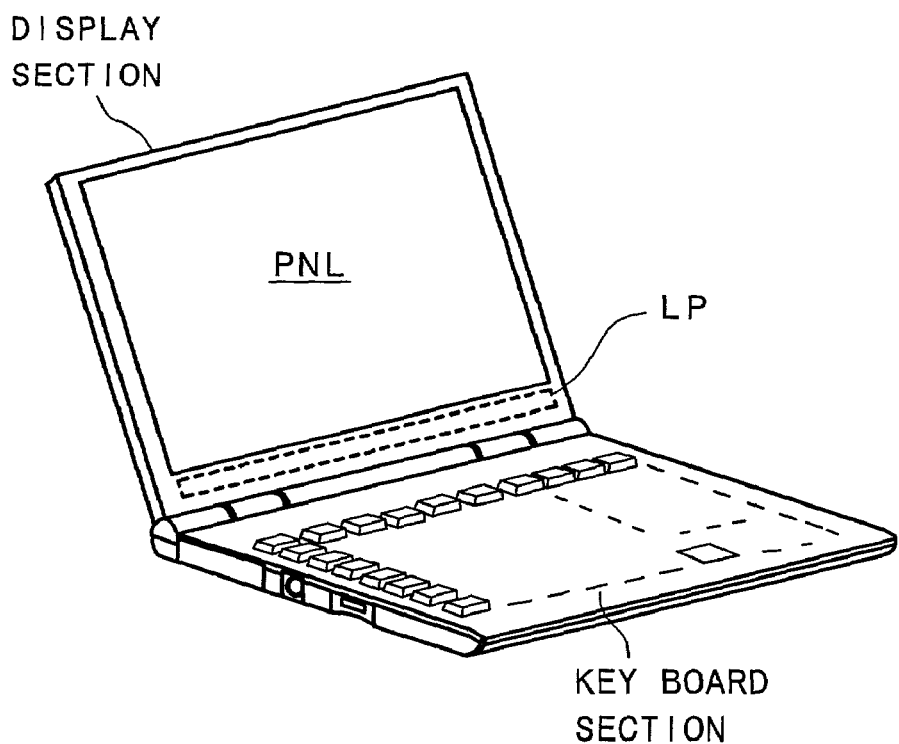
FIG. 24 is an appearance view showing an example of a notebook type personal computer on which the liquid crystal display device according to the invention is mounted.

FIG. 24 is an appearance view showing an example of a notebook type personal computer on which the liquid crystal display device of the invention is mounted. A liquid crystal panel which constitutes the liquid crystal display device to be mounted on a display part of the notebook type personal computer is provided with a linear lamp LP along a lower side thereof.

Figure 25:
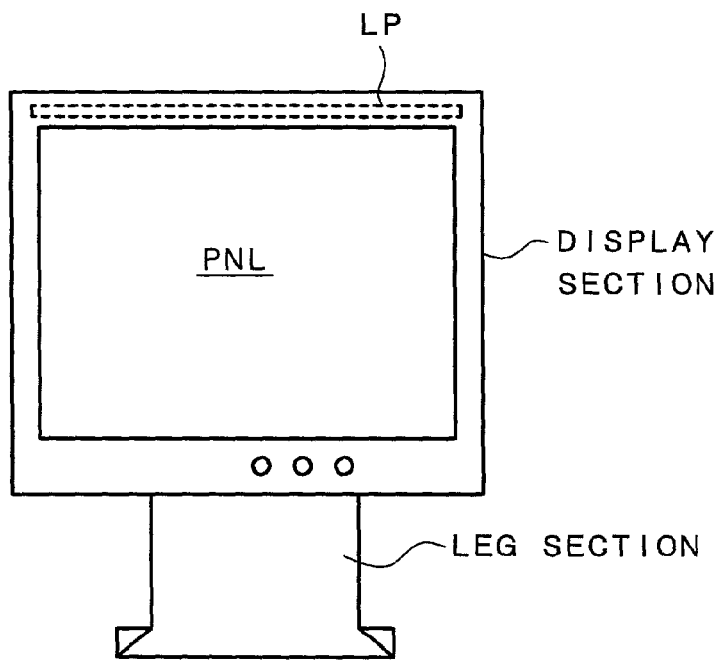
FIG. 25 is an appearance view showing an example of a desktop type monitor on which the liquid crystal display device according to the invention is mounted.
Figures 26A, 26B:
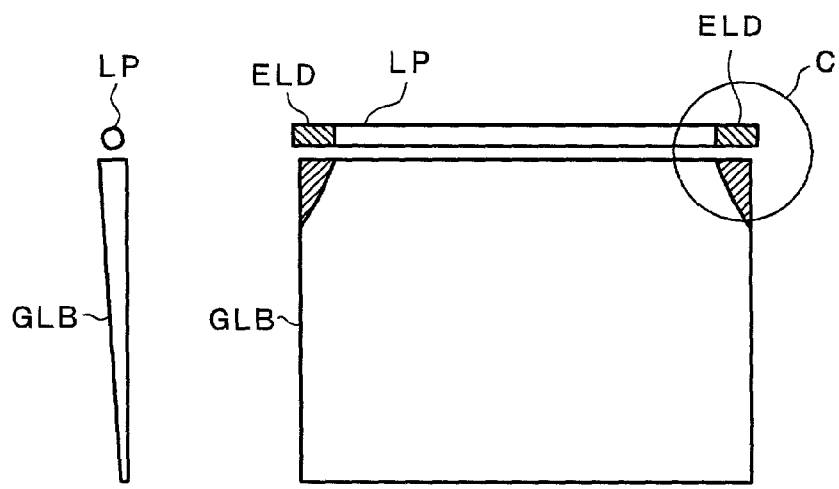

FIG. 25 is an appearance view showing an example of a desktop type personal computer on which the liquid crystal display device of the invention is mounted. A liquid crystal panel which constitutes the liquid crystal display device to be mounted on a display part of the monitor is provided with a linear lamp LP along an upper side thereof.

It is needless to say that the liquid crystal display device according to the invention can be used as a display device of the notebook type personal computer, the desktop type monitor and other equipment shown in FIGS. 24 and 25.

The invention is not only applicable to a chip-on-glass type liquid crystal display device which directly mounts drive ICs on one substrate of the liquid crystal panel but also applicable to a liquid crystal display device which uses a liquid crystal panel adopting a TCP for mounting drive ICs (integrated circuit chips) or a liquid crystal panel of a simple matrix type.

As has been explained heretofore, according to the invention, the occurrence of the display irregularity which is caused by the reduction in picture frame of the liquid crystal panel which constitutes the liquid crystal display device can be effectively prevented so that the liquid crystal device which has the least brightness irregularity, is capable of performing the high quality image display and exhibits the high reliability can be provided.

While we have shown and described several embodiments in accordance with the invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:
    a liquid crystal panel having a display area and a peripheral area;
    a backlight being disposed at a rear side surface of the liquid crystal panel; and
    a diffusing sheet and a prism sheet lying between the rear side surface of the liquid crystal panel and the backlight,
    wherein the backlight is provided by a substantially rectangular-shaped light guide plate and a linear lamp being disposed along an incidence plane provided at one side of the light guide plate,
    a light emission control pattern having a plurality of fan-shaped grooves slanted to one side of the light guide plate and formed at a corner portion of the side of the light guide plate, along which an end portion of the linear lamp is adjacent to, on a back surface except for a center portion of the light guide plate,
    the center of the fan-shaped grooves is positioned outside an end of the corner portion of the light guide light plate, and
    the plurality of the fan-shaped grooves are overlapped with the display area and the peripheral area of the liquid crystal panel.

2. A liquid crystal display device according to claim 1, wherein arrangement density of the grooves constituting the light emission control pattern are higher at an end side of the corner portion on the surface of the light guide plate.

3. A liquid crystal display device according to claim 2, wherein the grooves are formed radially out from the end side of the corner portion.

4. A liquid crystal display device according to claim 2, wherein the grooves are formed to be parallel to each other, and the arrangement density of the grooves is controlled by individual extension lengths thereof.

5. A liquid crystal display device according to claim 2, wherein the grooves are formed to be parallel to each other, and the arrangement density of the grooves is controlled by altering respective arrangement intervals or individual depths of the grooves.

6. A liquid crystal display device according to claim 1, wherein the light guide plate is transparent.

7. A liquid crystal display device comprising:
    a liquid crystal display panel having a display area and a peripheral area;
    a backlight; and
    a prism sheet disposed between the liquid crystal panel and the backlight,
    wherein the backlight is provided by a light guide plate and a
    linear lamp being disposed along at least one side of the light guide plate,
    a plurality of fan-shaped grooves are formed on a back surface of the light guide plate and formed at a corner portion of the side of the light guide plate, along which an end portion of the linear lamp is adjacent to, except for a center portion of the light guide plate,
    the center of the fan-shaped grooves is positioned outside an end of the corner portion of the light guide light plate, and
    the plurality of fan-shaped grooves are overlapped with the display area and the peripheral area.

8. A liquid crystal display device according to claim 7, comprising fine dots, wherein at least a part of an area at which the plurality of grooves are formed and at least a part of an area at which the fine dots are formed are overlapped with one another on the main surface of the light guide plate.

9. A liquid crystal display device according to claim 7, wherein an arrangement density of the grooves is higher at an end side of the corner portion of the light guide plate.

10. A liquid crystal display device according to claim 9, wherein the grooves are formed radially out from the end side of the corner portion.

11. A liquid crystal display device according to claim 9, wherein the grooves are formed to be parallel to each other, and the arrangement density of the grooves is controlled by individual extension lengths thereof.

12. A liquid crystal display device according to claim 9, wherein the grooves are formed to be parallel to each other, and the arrangement density of the grooves is controlled by altering respective arrangement intervals or individual depths of the grooves.

13. A liquid crystal display device according to claim 9, wherein the arrangement density of the grooves is controlled by altering respective arrangement intervals and individual depths of the grooves.

14. A liquid crystal display device according to claim 7, wherein the light guide plate is transparent.

15. A liquid crystal display device comprising:
a liquid crystal display panel having a display area and a peripheral area;
a light guide plate;
a prism sheet disposed between the liquid crystal display panel and the light guide plate; and
a linear lamp disposed along one side of the light guide plate,
wherein the back surface of the light guide plate has a plurality of first fan-shaped grooves and a plurality of second fan-shaped formed at both corner areas of the side of the light guide plate, along which an end portion of the linear lamp is adjacent to, except for a center portion of the light guide plate,
the plurality of first fan-shaped grooves are extended in a first direction slanted to the side of the light guide plate and the plurality of second fan-shaped grooves are extended in a second direction slanted to the side of the light guide plate,
the center of the first and second fan-shaped grooves is positioned outside an end of the corner portion of the light guide light plate, and
the plurality of first and second fan-shaped grooves are overlapped with the display area and the peripheral area of the liquid crystal panel.

16. A liquid crystal display device according to claim 15, wherein a density of the plurality of first and second grooves at an intermediate area located on the light guide plate between both the corner areas thereof is lower than those at both the corner areas thereof.

17. A liquid crystal display device according to claim 15, wherein a main surface of the light guide plate has a pair of edges along the corner area thereof, one of which is extended along the side of the light guide plate, and the plurality of grooves intersect at least one of the pair of edges thereof.

18. A liquid crystal display device according to claim 17, wherein extension lengths of the plurality of grooves from intersecting points thereof with at least one of the pair of edges of the light guide plate decrease as far as the intersecting points are spaced from a tip portion of the corner area.

19. A liquid crystal display device according to claim 17, wherein a density of the plurality of first grooves decreases as far as intersecting points thereof with at least one of the pair of edges spaced from a tip portion of the corner area.

20. A liquid crystal display device according to claim 15 wherein the plurality of first grooves are divided into at least two groups in accordance with intersecting angle thereof with the side of the light guide plate.

21. A liquid crystal display device according to claim 15 wherein the plurality of first grooves are extended radially from an edge of the light guide plate along the side thereof.

22. A liquid crystal display device according to claim 21, wherein the plurality of first grooves are divided into at least two groups in accordance with locations of respective base points one of which each of the plurality of grooves is extended radially from.

23. A liquid crystal display device according to claim 15, wherein the light guide plate is transparent.

* * * * *